US011175489B2

(12) United States Patent
Riza

(10) Patent No.: US 11,175,489 B2
(45) Date of Patent: Nov. 16, 2021

(54) SMART CODED ACCESS OPTICAL SENSOR

(71) Applicant: UNIVERSITY COLLEGE CORK—NATIONAL UNIVERSITY OF IRELAND, CORK, Cork (IE)

(72) Inventor: Nabeel Riza, Cork (IE)

(73) Assignee: University College Cork—National University of Ireland, Cork, Cork (IE)

( * ) Notice: Subject to any disclaimer, the term of this patent is extended or adjusted under 35 U.S.C. 154(b) by 0 days.

(21) Appl. No.: 16/479,915

(22) PCT Filed: Nov. 28, 2017

(86) PCT No.: PCT/EP2017/080700
§ 371 (c)(1),
(2) Date: Jul. 22, 2019

(87) PCT Pub. No.: WO2018/137812
PCT Pub. Date: Aug. 2, 2018

(65) Prior Publication Data
US 2019/0353887 A1    Nov. 21, 2019

(30) Foreign Application Priority Data
Jan. 26, 2017   (GB) .................................... 1701296

(51) Int. Cl.
*H04N 5/235* (2006.01)
*G02B 21/36* (2006.01)
(Continued)

(52) U.S. Cl.
CPC ........... *G02B 21/367* (2013.01); *G02B 21/16* (2013.01); *G06T 5/10* (2013.01); *G06T 5/50* (2013.01);
(Continued)

(58) Field of Classification Search
CPC .. H04N 5/2355; H04N 5/2354; H04N 5/2351; H04N 5/335; G02B 21/367;
(Continued)

(56) References Cited

U.S. PATENT DOCUMENTS

| | | | | | |
|---|---|---|---|---|---|
| 4,232,969 | A | * | 11/1980 | Wilczynski | ........... G03F 9/7069 356/401 |
| 6,272,095 | B1 | * | 8/2001 | Liu | ...................... G11B 7/0045 369/103 |

(Continued)

FOREIGN PATENT DOCUMENTS

| | | |
|---|---|---|
| WO | 2005120044 A1 | 12/2005 |
| WO | 2016062785 A2 | 4/2016 |

OTHER PUBLICATIONS

PCT/EP2017/080700. International Search Report and Written Opinion dated May 22, 2018. 19 pages.
(Continued)

*Primary Examiner* — Zaihan Jiang
(74) *Attorney, Agent, or Firm* — Loza & Loza, LLP; Anthony Smyth

(57) ABSTRACT

The present invention provides a method for performing high dynamic range low inter-pixel spatial and wavelength crosstalk optical image detection in a camera comprising an Optical Array Device (OAD), a point Photo Detector (PD) and a Photo Detector Array (PDA) sensor. The method comprises imaging incident light from an object onto an image plane of the Optical Array Device (OAD) to form an incident image map; selecting by the OAD and the Point Photo Detector and by the OAD and the Photo Detector Array a plurality of pixels on the incident image map for time-frequency coding; time-frequency coding the selected pixels by the OAD; detecting by the point PD the optical irradiance values of the time-frequency coded pixels output from the OAD; and performing signal processing on the
(Continued)

detected optical irradiance values to determine the light intensity of each of the selected pixels.

19 Claims, 20 Drawing Sheets

(51) Int. Cl.
  *G06T 5/10* (2006.01)
  *G06T 5/50* (2006.01)
  *G02B 21/16* (2006.01)
(52) U.S. Cl.
  CPC ......... *H04N 5/2351* (2013.01); *H04N 5/2355* (2013.01); *G06T 2200/21* (2013.01); *G06T 2207/10056* (2013.01); *G06T 2207/20221* (2013.01)
(58) Field of Classification Search
  CPC .. G02B 21/16; G06T 5/10; G06T 5/50; G06T 5/335; G06T 2207/10056; G06T 2200/21; G06T 2207/20221
  See application file for complete search history.

(56) References Cited

U.S. PATENT DOCUMENTS

| | | | | |
|---|---|---|---|---|
| 7,012,738 | B1* | 3/2006 | Schwarte | G02F 2/002 359/325 |
| 2013/0128042 | A1* | 5/2013 | Bridge | H04N 5/232 348/143 |
| 2013/0195316 | A1* | 8/2013 | Bataller | G06K 9/6255 382/103 |
| 2013/0257646 | A1* | 10/2013 | Gopalsami | G01S 13/89 342/179 |
| 2015/0287169 | A1* | 10/2015 | Ueda | B29C 64/124 348/86 |
| 2016/0258964 | A1* | 9/2016 | Zhang | G01N 33/66 |
| 2017/0163971 | A1* | 6/2017 | Wang | G01S 17/10 |
| 2017/0270388 | A1* | 9/2017 | Vercruysse | G03H 1/0443 |
| 2017/0358063 | A1* | 12/2017 | Chen | H04N 9/64 |
| 2018/0242006 | A1* | 8/2018 | Kerofsky | H04N 19/186 |
| 2018/0278967 | A1* | 9/2018 | Kerofsky | H04N 19/186 |

OTHER PUBLICATIONS

Riza Nabeel A Ed—Szczepanski Pawel et al., "Coded access optical sensor (CAOS) imager and applications", Proceedings Optical Diagnostics of Living Cells II, SPIE, US,vol. 9896, Apr. 29, 2016 (Apr. 29, 2016), p. 98960A-98960A, XP060071036.

Riza Nabeel A Ed—Szczepanski Pawel et al., "The CAOS camera platform: ushering in a paradigm change in extreme dynamic range imager design", Proceedings Optical Diagnostics of Living Cells II, SPIE, US, vol. 10117, Feb. 20, 2017 (Feb. 20, 2017), p. 101170L-101170L, XP060083358.

* cited by examiner

SMART CODED ACCESS OPTICAL SENSOR

CROSS-REFERENCE TO RELATED APPLICATIONS

This application is the U.S. National Stage of International Patent Application No. PCT/EP2017/080700 filed on Nov. 28, 2017, which claims the benefit of priority from GB Patent Application No. 1701296.4 filed Jan. 26, 2017, the disclosures of the foregoing applications being incorporated herein by reference in their entirety for all applicable purposes.

BACKGROUND TO THE INVENTION

Today's large-scale deployment of multi-pixel CMOS (complementary metal-oxide-semiconductor) and CCD (charge-coupled devices) camera technology intrinsically supports 60 dB level linear dynamic ranges that can reach higher 100 dB level dynamic ranges using a variety of techniques, such as using hardware modifications in the sensor chip by increasing pixel size and pixel integration time, or by using several pixel resets within the integration time to implement range compression before saturation, and using photo-diode pixel response curves to decompress the optical irradiance data to the full range. Another hardware approach uses a spatially varying exposure method by depositing neutral density filters on the pixel array so some pixels recover the brighter zones and others catch the weaker light areas. Unlike linear CMOS/CCD/FPA sensors, where pixel photo-voltage is proportional to the incident light irradiance on the pixel, an alternate design CMOS sensor has been implemented to achieve higher dynamic range by using per pixel logarithmic amplifiers to compress the photo-detected electrical signal (i.e., photo-voltage is a logarithm of the incident light irradiance), although at the cost of increased readout noise, due to the limited voltage swing for the read-out electronics, giving reduced sensitivity which leads to lower image contrasts. Another approach called lin-log uses a linear response of the pixel over the lower dynamic range while a log response over the brighter region of the image. This method maintains the better sensitivity (and image contrast) in the lower dynamic range region, but produces lower sensitivity and signal-to-noise in the log compressed higher dynamic range (HDR) of the camera. In addition, software methods such as deployment of multi-image capture processing have been used to increase the dynamic range, but at the cost of producing image combination artefacts with varying signal-to-noise ratio image capture. Specifically, multi-image processing to produce an HDR image puts certain constraints on both the camera operation and viewed scene. For instance, a small camera aperture creating a large depth of field is needed; plus the scene should have no motion and the camera should be on a tripod, otherwise one gets ghosting. In addition, the scene should not have a shallow depth of field, as then the post-processing produces image artefacts. Furthermore, using a smaller aperture in the camera also leads to lower light levels on the optical sensor, adding further challenges for extreme dynamic range image capture and recovery.

Clearly, recent camera and CMOS chip developments indicate the commercial need and value with respect to high dynamic range cameras. Nevertheless, these CMOS sensor each have their fundamental limitations. Particularly, when using non-linear pixel responses that reduce signal-to-noise, sensitivity, color reproduction, and image contrast, creating non-uniform imaging quality. So although today's commercial multi-pixel sensor-based imagers can have excellent spatial resolution and pixel count with improving dynamic ranges for the acquired visible band image, the camera is fundamentally designed from a mainly fixed space-time-frequency pixel view point where the image acquisition work load is placed equally on the large number (e.g., 1,000,000) of individual pixels (point photo-detectors) in the camera. In many applications, the light irradiance ($W/m^2$) levels are not uniformly distributed across the image space, with some pixel zones carrying extremely bright light irradiances and others with very weak light levels. This is counter intuitive to the equal work load assigned to all pixels in the classic and dominant multi-pixel image sensor design method. Specifically, multi-pixel photo-detection devices such as CCD/CMOS and Focal Plane Array (FPA) sensors have inherently small quantum well sizes that limit the camera performance in terms of pixel saturation levels, linearity, limited image read-out speed, blooming and spill-over caused inter-pixel crosstalk and inter-pixel dead zone light scattering. In addition, depending on the wavelength and type of FPA, cooling is required to produce low noise and higher dynamic range.

It is important to appreciate that fundamentally using current PDA technology, one simply collects imaged light in a continuous wave (or DC light) fashion with the bright pixel detection in the PDA device mainly constrained by the limited quantum full well capacity of the small and fixed active area of the photo-sensor pixel, as well as by the bright photons generated shot noise in the pixel. In the case of imaged dim light detection with a current PDA device, the electrical dark current noise in the tiny fixed area pixel restricts the output electrical signal-to-noise ratio, and thus the ability to decipher the dim light electrical signal from the detector noise floor. Thus, to expect a quantum jump in the dynamic range provided by a new camera technology, it is reasonable to assume that a paradigm change is required in camera design that avoids the continuous wave or DC light collection via a fixed active area pixel approach that provides a DC electrical signal output from the imager.

Thus, there exists a challenge to design, build, and test a smart extreme linear dynamic range wavelength band flexible camera where scenes exists with both bright and weak light targets of extreme importance that need adequately fast application dependent reliable detection to enhance safety of both human and machine operations. Again, it is important to stress that the desired camera should have the capability to provide extreme linear dynamic range adequate intelligent image pixel information fast enough for pattern recognition (e.g., like an identify friend or foe (IFF) decision in military systems) to make a potentially lifesaving vehicle platform operator decision versus receiving an extreme megapixel count super high spatial resolution limited dynamic range image that fails to detect the targets of interest in the extreme contrast scene.

To take on the challenge of smart extreme contrast imaging the inventor of the present invention invented the CAOS camera. CAOS stands for Coded Access Optical Sensor. CAOS is described in International Patent Publication No. WO 2016/062785, UK Patent Application No. 1418678.7, filed Oct. 21, 2014 and 1422684.9 filed 18 Dec. 2014 and U.S. patent application Ser. No. 15/163,381, filed May 28, 2015. In the passive mode CAOS camera, agile pixels of the light are selectively captured from an image space and are rapidly encoded like RF signals in the time-frequency-space domain using an Optical Array Device (OAD) such as a multi-pixel spatial light modulator (SLM). Radio Frequency (RF) coded light from these agile pixels are simultaneously detected by one point optical-to-RF detector/antenna. The output of this optical detector undergoes RF decoding via electronic wireless-style processing to recover the light levels for all the agile pixels in the image. On the contrary, CCD/CMOS/FPA cameras simply collect light from an image, so photons which are collected in the sensor buckets/wells are transferred as electronic charge values (DC levels). There is no deployment of time-frequency content of the photons. CAOS forms an active imager when the OAD is a time-frequency-amplitude modulated light source array. Hence, CAOS forms both a passive and/or active imager and is a paradigm shift in imager design empowered by modern day advances in wireless and wired devices in the optical and electronic domains.

The present invention discloses a plurality of different CAOS camera designs for use with a plurality of different imaging applications.

SUMMARY

According to the invention, there is provided, as set out in the appended claims, a method for performing high dynamic range low inter-pixel spatial and wavelength crosstalk optical image detection in a camera comprising an Optical Array Device (OAD), a point Photo Detector (PD) and a Photo Detector Array (PDA) sensor comprising: imaging incident light from an object onto an image plane of the Optical Array Device (OAD) to form an incident image map; selecting by the OAD and the Point Photo Detector and by the OAD and the Photo Detector Array a plurality of pixels on the incident image map for time-frequency coding; time-frequency coding the selected pixels by the OAD; detecting by the point PD the optical irradiance values of the time-frequency coded pixels output from the OAD; and performing signal processing on the detected optical irradiance values to determine the light intensity of each of the selected pixels to acquire an image of the object.

In one embodiment, the step of selecting the plurality of pixels on the incident image map for time-frequency coding comprises:
detecting by the PDA intensity values of the incident image map output from the OAD; and
performing multi-image processing on the detected intensity values to select the plurality of pixels on the incident image map for time-frequency coding.

In one embodiment, the step of selecting the plurality of pixels on the incident image map for time-frequency coding comprises:
performing by the OAD spatial code modulation of the incident image map;
detecting by the point PD intensity values of the spatial code modulated light output from the OAD;
performing computational image processing on the detected intensity values to select the plurality of pixels on the incident image map for time frequency coding.

In one embodiment, the step of performing by the OAD spatial code modulation of the incident image map comprises displaying a plurality of 2-D spatial masks on the OAD.

In one embodiment, the step of displaying the plurality of 2-D spatial masks on the OAD further comprises oscillating in time each of the displayed 2-D spatial masks on the OAD.

In one embodiment, the step of oscillating each of the displayed 2-D spatial masks on the OAD comprises switching the OAD from displaying a 2-D spatial mask to a dummy spatial mask after the OAD frame time for a predetermined time period.

In one embodiment, the step of detecting by the point PD intensity values of the spatial code modulated light comprises generating by the point PD an AC signal proportional to the intensity values with a base repetition frequency equal to half the frame rate of the OAD.

In one embodiment, the computational image processing comprises linear transform and/or non-linear imaging methods.

In one embodiment, the linear imaging method comprises the Hadamard transform.

In one embodiment, the non-linear imaging method comprises compressive sensing computational imaging using an iterative algorithm.

In one embodiment, the method further comprises determining by the point PD and by the PDA the spatial size and shape of the selected plurality of pixels on the incident image map for time-frequency coding.

In one embodiment, the incident light comprises multi-band light, and wherein the camera comprises a first point PD and a second point PD, a first PDA and a second PDA, and further comprises a first tunable filter and a second tunable filter and a first beam splitter filter and a second beam splitter filter; and
wherein the method further comprises the steps of:
configuring the first tunable filter to only pass light output from the OAD having a wavelength within a first predetermined optical band or a second predetermined optical band of the multi-band light;
directing by the first beam splitter filter light output from the first tunable filter having a wavelength within the first predetermined optical band to the first point PD for detection and light having a wavelength within the second predetermined optical band to the second point PD for detection; and
directing by the second beam splitter filter light having a wavelength within the first predetermined optical band to the first PDA for detection via the second tunable filter and light having a wavelength within the second predetermined optical band to the second PDA for detection via the third tunable filter.

In one embodiment, the method further comprises the steps of:
focussing the incident light prior to imaging the light onto the image plane of the OAD;
focussing the light output from the OAD prior to the passing the light to the first tunable filter and to the second beam splitter filter.

In one embodiment, the first tunable filter comprises:
a wavelength dispersion element and a Digital Micromirror Device (DMD), wherein the wavelength dispersion element splits the light output from the OAD into separate wavelengths for imaging onto an image plane of the DMD, and further wherein when the light received on the image plane of the DMD corresponds to the optical irradiance values of the time-frequency coded pixels output from the OAD, the DMD is further configured to time-frequency code the light, such that the first point PD and the second point PD detect double CAOS time-frequency coded light.

In one embodiment, the camera further comprises a first emission filter and a second emission filter; and wherein the method further comprises the steps of:
passing light through the first emission filter prior to detection by the point PD; and passing light through the second emission filter prior to detection by the PDA.

In one embodiment, the method further comprises:
focussing the incident light prior to imaging the light onto the object plane of the OAD;

focussing the light output from the OAD prior to the passing the light through the first emission filter and through the second emission filter.

In one embodiment, the imaged light comprises light emitted from a specimen and passed through a microscope objective.

In one embodiment, the imaged light comprises fluorescent light emitted from a specimen to be 2-D or 3-D imaged by the camera; and wherein each pixel on the imaged light map selected for time-frequency coding corresponds to a single fluorescence emission from the specimen.

In one embodiment, the method further comprises:
providing a reflection mode fluorescence excitation source to excite the specimen to emit fluorescent light; and
providing a beam splitter to direct light emitted from the reflection mode source through the microscope objective for exciting the specimen and to direct fluorescent light emitted from the specimen to the OAD.

In one embodiment, the method further comprises:
providing a transmission mode fluorescence excitation source; and
providing a mirror to direct light emitted from the transmission mode source to the specimen.

In one embodiment, the method further comprises:
providing a fluorescence excitation source to excite the specimen to emit fluorescent light; and
providing a cylinder and a second microscope in the path of the light from the source to the specimen to generate a light sheet inside the specimen to implement 3-D CAOS-mode imaging via light sheet microscopy.

In one embodiment, the excitation source comprises a time-frequency modulated laser.

In one embodiment, the incident light comprises light emitted from a specimen in a digital holography system arrangement and passed through a microscope objective, the method further comprising:
focussing the incident light prior to imaging the light onto the image plane of the OAD; and
focussing the light output from the OAD prior to detection by the point PD and by the PDA.

In one embodiment, the method further comprises:
providing a laser source for illuminating the specimen; and
providing a first beam splitter to direct a first portion of light from the laser source to the specimen via a first mirror and to direct a second portion of light from the laser source to a second beam splitter via a second mirror; and wherein the second beam splitter also directs the focussed incident light to the OAD.

In one embodiment, the method further comprises:
focussing the incident light prior to imaging the light onto the image plane of the OAD;
focussing the light output from the OAD prior to detection by the point PD and by the PDA; and
passing the focussed light through a lenslet array prior to detection by the PDA such that each sub-image on the lenslet array is detected by the PDA.

In one embodiment, the OAD comprises a reflective OAD.

In one embodiment, the OAD comprises a reflective 1-D OAD, and the camera comprises a point PD and a first PDA and a second PDA, the first PDA and point PD for detection of the light output from the OAD, the method further comprising the steps of:

focussing the incident light onto a beam splitter;
directing by the beam splitter a first portion of the 2-D incident light onto 1-D translation optics and a second portion of the incident light onto the second PDA; and
focussing the 1-D translated light from the translation optics onto the 1-D OAD;
wherein the second PDA is configured to perform multi-image processing on the detected intensity values to select the plurality of pixels on the incident image map of the 1-D OAD for time-frequency coding.

In one embodiment, the 1-D translation optics comprises one of: a mechanical optic, a Risley prism and/or an electronically controlled SLM device.

In one embodiment, the reflective 1-D OAD comprises a 1-D fast MEMS optical device.

In one embodiment, the OAD comprises a Digital Micro-Mirror Device.

In one embodiment, the method further comprises:
repeating the steps of the method in respect of one or more different modes of operation of the camera to acquire a set of images of the object; and
performing image fusion techniques on the acquired set of images to form an optimal image of the object.

In one embodiment the OAD comprises a transmissive OAD and the incident light comprises multi-band light, and wherein the camera comprises a first point PD and a second point PD, a first PDA and a second PDA, and further comprises a first tunable filter, a second tunable filter, a third tunable filter and a fourth tunable filter, a first dichroic beam splitter filter and a second dichroic beam splitter filter and a broadband beam splitter; and
wherein the method further comprises the steps of:
configuring the broadband beam splitter to direct a first portion of the multi-band light to the first dichroic beam splitter and to direct a second portion of the multi-band light to the second dichroic beam splitter;
directing by the first dichroic beam splitter filter light output from the OAD having a wavelength within the first predetermined optical band to the first point PD for detection via the fourth tunable filter and light having a wavelength within the second predetermined optical band to the second point PD for detection via the third tunable filter; and
directing by the second dichroic beam splitter filter light having a wavelength within the second predetermined optical band to the first PDA for detection via the second tunable filter and light having a wavelength within the first predetermined optical band to the second PDA for detection via the first tunable filter.

In one embodiment, the camera further comprises a first lens located in the path of the incident light, a second lens located prior to the second tunable filter, a third lens located prior to the first tunable filter, a fourth lens located prior to the fourth tunable filter and a fifth lens located prior to the third tunable filter, and wherein the method further comprises:
imaging the incident light onto the first PDA by means of the first lens and the second lens forming an imaging lens pair;
imaging the incident light onto the second PDA by means of the first lens and the third lens forming an imaging lens pair;
imaging the incident light onto the first point PD by means of the first lens and the fourth lens form an imaging lens pair; and
imaging the incident light onto the second point PD by means of the first lens and the fifth lens forming an imaging lens pair.

In another embodiment of the invention there is provided a Coded Access Optical Sensor (CAOS) camera for performing high dynamic range low inter-pixel spatial and wavelength crosstalk optical image detection, the camera comprising an Optical Array Device (OAD), a point Photo Detector (PD), a Photo Detector Array (PDA) sensor and a first lens for directing the incident light from an object to the OAD, the camera further comprising:

a module for imaging the focussed incident light onto an image plane of the OAD to form an incident image map;

a module for selecting by the OAD and the Point Photo Detector and by the OAD and the Photo Detector Array a plurality of pixels on the incident image map for time-frequency coding;

a module for time-frequency coding the selected pixels by the OAD;

a module for detecting by the point PD the optical irradiance values of the time-frequency coded pixels output from the OAD; and a module for performing signal processing on the detected optical irradiance values to determine the light intensity of each of the selected pixels so as to acquire an image of the object.

In one embodiment, the first lens, the OAD and the point PD are arranged such that the OAD is located substantially above and adjacent the point PD in the vertical plane and the first lens is located substantially above the OAD in the vertical plane.

In one embodiment, the PDA is located adjacent the point PD in the horizontal plane, and further comprising a second lens for directing the incident light from the object to the PDA, wherein the second lens is arranged substantially above the PDA in the vertical plane and adjacent the first lens in the horizontal plane.

In one embodiment, the method further comprises a beam splitter and a mirror, wherein the beam splitter is arranged substantially above the first lens in the vertical plane and the mirror is arranged substantially above the second lens in the vertical plane, and further wherein the beam splitter is configured to direct a first portion of the incident light to the first lens and to direct a second portion of the incident light to the second lens via the mirror.

In one embodiment, the method further comprises a third lens for receiving the incident light, wherein the third lens is located adjacent the second lens in the horizontal plane.

In one embodiment, the OAD comprises a reflective OAD, the first lens is located substantially above the OAD in the vertical plane, and the OAD, the Point PD and the PDA are located adjacent one another in the same horizontal plane, and wherein the camera further comprises a second lens coupled above and to a second mirror for receiving light output from the OAD and directing it to the PDA, and a third lens coupled above and to a third mirror for receiving light output from the OAD and directing it to the point PD, wherein the first lens, the second lens and the third lens are located adjacent one another in the same horizontal plane.

In one embodiment, the OAD is located substantially above the point PD in the vertical plane, and the point PD and the PDA are located adjacent one another in the same horizontal plane, and wherein the camera further comprises a 2-tilt state mirror located substantially below the first lens in the vertical plane, a second lens coupled above and to a second mirror for receiving light output from the 2-tilt state mirror and directing it to the PDA, and a third lens coupled above and to a third mirror for receiving light output from the 2-tilt state mirror and directing it to the OAD, wherein the first lens, the second lens and the third lens are located adjacent one another in the same horizontal plane.

In one embodiment, the point PD comprises a point PD array.

In one embodiment, the point PD array comprises three independent point PDs.

In one embodiment, the dimensions of the point PD, OAD, PDA and one or more lens are adapted for use in a portable imaging application.

In another embodiment of the invention there is provided a Coded Access Optical Sensor (CAOS) camera for performing high dynamic range low inter-pixel spatial and wavelength crosstalk optical image detection, the camera comprising an Optical Array Device (OAD), a point Photo Detector (PD), a Photo Detector Array (PDA) sensor and a first lens for directing the incident light from an object to the OAD, the camera further comprising:

a module for imaging the focussed incident light onto an image plane of the OAD to form an incident image map;

a module for selecting by the OAD and the Point Photo Detector and by the OAD and the Photo Detector Array a plurality of pixels on the incident image map for time-frequency coding;

a module for time-frequency coding the selected pixels by the OAD;

a module for detecting by the point PD the optical irradiance values of the time-frequency coded pixels output from the OAD; and a module for performing signal processing on the detected optical irradiance values to determine the light intensity of each of the selected pixels.

In another embodiment of the invention there is provided a method for performing high dynamic range low inter-pixel spatial and wavelength crosstalk optical image detection in a camera comprising an Optical Array Device (OAD), a point Photo Detector (PD) and a Photo Detector Array (PDA) sensor comprising: imaging incident light from an object onto an image plane of the Optical Array Device (OAD) to form an incident image map; selecting by the OAD and the Point Photo Detector and by the OAD and the Photo Detector Array a plurality of pixels on the incident image map for time-frequency coding; time-frequency coding the selected pixels by the OAD; detecting by the point PD the optical irradiance values of the time-frequency coded pixels output from the OAD; and performing signal processing on the detected optical irradiance values to determine the light intensity of each of the selected pixels.

In one embodiment, the method further comprises associating a unique binary code sequence with each of the selected pixels, and wherein the step of time-frequency coding the selected pixels by the OAD comprises time modulating the incident light irradiance of each of the selected pixels with their associated binary code sequence.

In one embodiment, the binary code sequence comprises a Code Division Multiple Access, CDMA, code.

In one embodiment, the time modulation of the incident light irradiance of each of the selected pixels with their associated CDMA code comprises baseband CDMA modulation.

In one embodiment, the time modulation of the incident light irradiance of each of the selected pixels with their associated CDMA code comprises CDMA modulation at a carrier frequency.

In one embodiment, the method further comprises performing the CDMA modulation at a carrier frequency by embedding each of the 1 bit CDMA code values of the selected pixels with a carrier signal having a first frequency.

In one embodiment, the period of the carrier signal is ½τ, wherein 1/τ comprises the frame update rate of the OAD, and wherein the number of full period cycles in the carrier is M.

In one embodiment, the step of embedding each of the 1 bit CDMA code values of the selected pixels with the carrier signal comprises:

displaying on the OAD a first image frame comprising a spatial pattern of those selected pixels having a 1 bit CDMA code value; and displaying on the OAD in the image frame following the first image frame a second image frame comprising a spatially blank pattern; and repeating the display of the first image frame and the second image frame M times to generate a carrier signal with M cycles.

In one embodiment, the method further comprises embedding each of the 0 bit CDMA code values of the selected pixels with a carrier signal having a second frequency.

In one embodiment, the selected pixels comprise a first set of pixels and a second set of pixels, and wherein the first set of pixels and the second set of pixels are of equal number and use the same set of CDMA codes, and wherein the method further comprises performing the CDMA modulation at a carrier frequency by:

embedding each of the 1 bit CDMA code values of the first set of pixels with a carrier signal having a first frequency; and embedding each of the 1 bit CDMA code values of the second set of pixels with a carrier signal having a second frequency.

In one embodiment, the first set of pixels comprise those selected pixels located in the upper half of the OAD, and the second set of pixels comprise those selected pixels located in the lower half of the OAD.

In one embodiment, the OAD comprises a reflective OAD, and wherein the method further comprises the steps of:

focussing the incident light prior to imaging the incident light onto the image plane of the OAD; and time-frequency coding the selected pixels on the image plane of the OAD line by line.

In one embodiment, the incident light comprises light from a scene with linear motion.

In one embodiment, the OAD comprises a reflective 2-D DMD, and wherein the step of time-frequency coding the selected pixels on the image plane of the OAD line by line comprises configuring the DMD such that each line of micromirrors in the DMD performs time-frequency coding in turn.

In one embodiment, the method further comprises associating a unique analog time sequence code with each of the selected pixels, and wherein the step of time-frequency coding the selected pixels by the OAD comprises the step of time modulating the incident light irradiance of each of the selected pixels with their associated analog time sequence code.

In one embodiment, the method further comprises associating a unique digital-analog time sequence code with each of the selected pixels, and wherein the step of time-frequency coding the selected pixels by the OAD comprises the step of time modulating the incident light irradiance of the selected pixels with their associated digital-analog time sequence code.

In one embodiment, the OAD comprises a reflective 2-D OAD, and wherein the method further comprises the steps of:

imaging the incident light one line at a time onto the image plane of the OAD; and time-frequency coding the selected pixels of each imaged line in the incident image in the y direction using optical gray scale amplitude modulation.

In one embodiment, the camera further comprises a 1-D slit, and a plurality of cylindrical lenses, and wherein the step of imaging the incident light one line at a time onto the image plane of the OAD comprises the steps of:

sampling each line of the incident light in turn by the 1-D slit; and imaging each sampled line of incident light onto the OAD via the plurality of cylindrical lenses to form an imaged line along the x axis of the OAD.

In one embodiment, the 1-D slit is moveable along the y axis to enable the sampling of each line of the incident light in turn by the 1-D slit.

In one embodiment, the method further comprises performing a linear translation of the incident light to enable the sampling of each line of the incident light in turn by the 1-D slit.

In one embodiment, the OAD comprises a reflective 2-D OAD, and wherein the incident light comprises light emitted from an optical coherence tomography, OCT, system.

In one embodiment, the incident light irradiance of each of the selected pixels are simultaneously time modulated with their associated binary code sequence.

In one embodiment, the OAD is configured to provide a relative time delay between each of the unique binary code sequences used to time modulate the incident light irradiances of the selected pixels.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
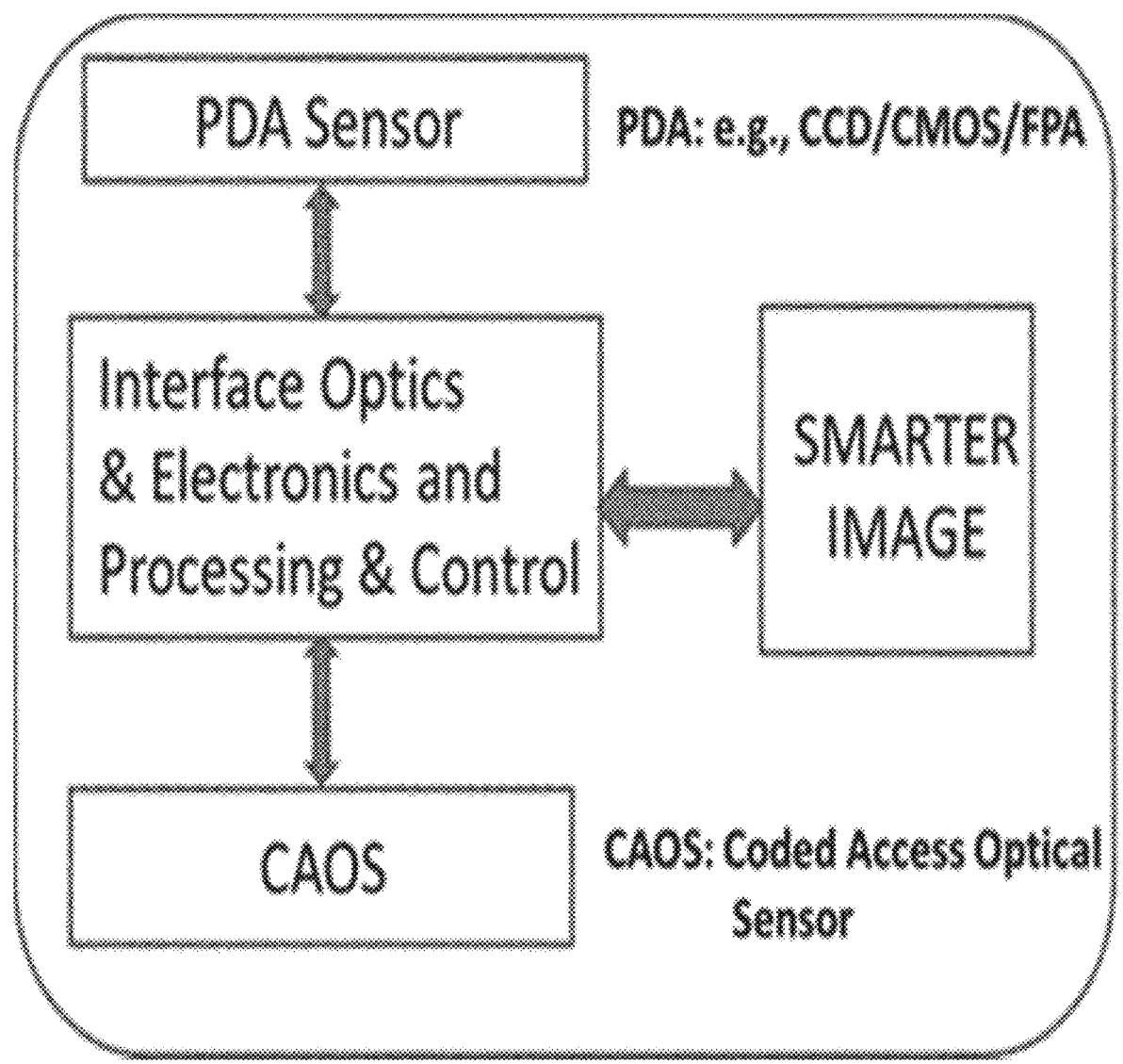
FIG. 1 shows a block diagram of the main components of the CAOS camera of the present invention.

One embodiment of the main components of the CAOS camera design of the present invention is shown in FIG. 1. It can be seen that it comprises a hybrid camera design both from a hardware and software point of view. Specifically, CAOS hardware works in unison with current limited linear dynamic range multi-pixel sensor (e.g., CMOS/CCD/FPA) hardware to smartly and simultaneously engage photonic as well as electronic signal processing in the CAOS-mode time-frequency coding domain to make possible an exceptional performance desired hybrid (H) imager. In effect, the PDA imager guides the selection of agile pixels in the CAOS imager to pull out image data from regions of interests where an extreme dynamic range enquiry is necessary for optimal imaging. Thus, CAOS breaks the prior-art paradigm of equal work load for all pixels in the image zone by smartly creating agile pixels to match the pixel work load where it is most needed, in as sense, creating a distributed work load model to match the typical scene application. The hybrid nature of the CAOS camera is proposed on the software level, i.e., on the image processing level where the same CAOS platform hardware (i.e., the OAD can be used to display a 2-D spatial code to spatially sample the incident image map) is used to implement classic linear transform (e.g., Hadamard variety) and non-linear computational imaging techniques (including via iterative algorithms for compressed sensing) to quickly pull-out lower dynamic range estimates of the observed scene in order to guide the extreme dynamic range CAOS-mode operations of the camera. Specifically in these classic computational imaging methods, the N spatially separated light spectral channels (or image pixel channels) are multiplied by N different spatial 2-D orthogonal (matrix) masks, one mask at a time. For each of mask programmed on the OAD, the total light from all the N light channels is collected at one time by one point-PD to give an intensity reading. So for N different spatial masks, one gets N independent intensity readings (DC values) via the point photo-detector that are stored sequentially and then later are subjected to inverse matrix (transform) image processing to recover the incident light intensity of the N spectral/spatial channels. It is important to note that this classic computational imaging method is a time sequential method that used spatial coding and is not the CAOS-mode frequency (Hz) coding of the spatially separated image pixel or spectral data.

In contrast, the extreme dynamic range CAOS imaging directly samples and preserves the true optical irradiances of the incident image. The fundamental CAOS-mode extreme dynamic range multiple access imaging procedure is not based on classic linear transform or compressive computational sensing techniques. In compressive and transform computational sensing, spatial projections across the image spatial domain are in play for sparse sampling, and the collected time sequential data is next subjected to iterative algorithm or inverse transformations (spatial correlations) with non-linear or linear processing, respectively. On the contrary, time-frequency content (Hz domain) of the selected simultaneous agile pixels in the image is in play via time-frequency correlations (transforms) for CAOS-mode camera image capture and recovery. In other words, spatial locations of the selected agile pixels with respect to each other have no fundamental role (e.g., via spatial correlations) in the individual pixel irradiance time-frequency encoding and decoding process implemented for the CAOS-mode of the camera.

So it is important to note that the spatial size and shape of each agile pixel in the smart pixel set (used in the CAOS-mode) that is sampling the incident image region of interest in the CAOS camera is programmed and controlled using prior or real-time image application intelligence gathered by the CAOS-mode imaging working in unison with other classic multi-pixel sensor hardware and computational imaging methods operating within the CAOS hardware platform. In addition, the PDA sensor in the CAOS camera gathers additional image information using prior-art classic multi-image processing methods that are also used to guide the CAOS-mode of the camera and produce an overall smart image. Thus the proposed CAOS camera forms a Hybrid (H) design smart imaging platform that also engages existing conventional imaging methods. For example, limited dynamic range image intelligence can be quickly gathered using classic compressive sensing. As mentioned, this computational technique is based on image spatial projections data combined with numerical optimization processing and will use the same CAOS hardware platform to give the estimated lower dynamic range image. In this hybrid design case, the CAOS camera agile pixel acquires a kind of space-time-frequency representation. Other linear transform computational methods can also be deployed within the CAOS camera platform by appropriately programming spatial masks on the SLM. Thus, the CAOS camera platform of the present invention is a true hybrid design, both from a hardware point-of-view as well as a computational point-of-view, unleashing the strengths of various technologies and methods while countering their limitations to deliver the best image possible for the given application.

Figure 2:
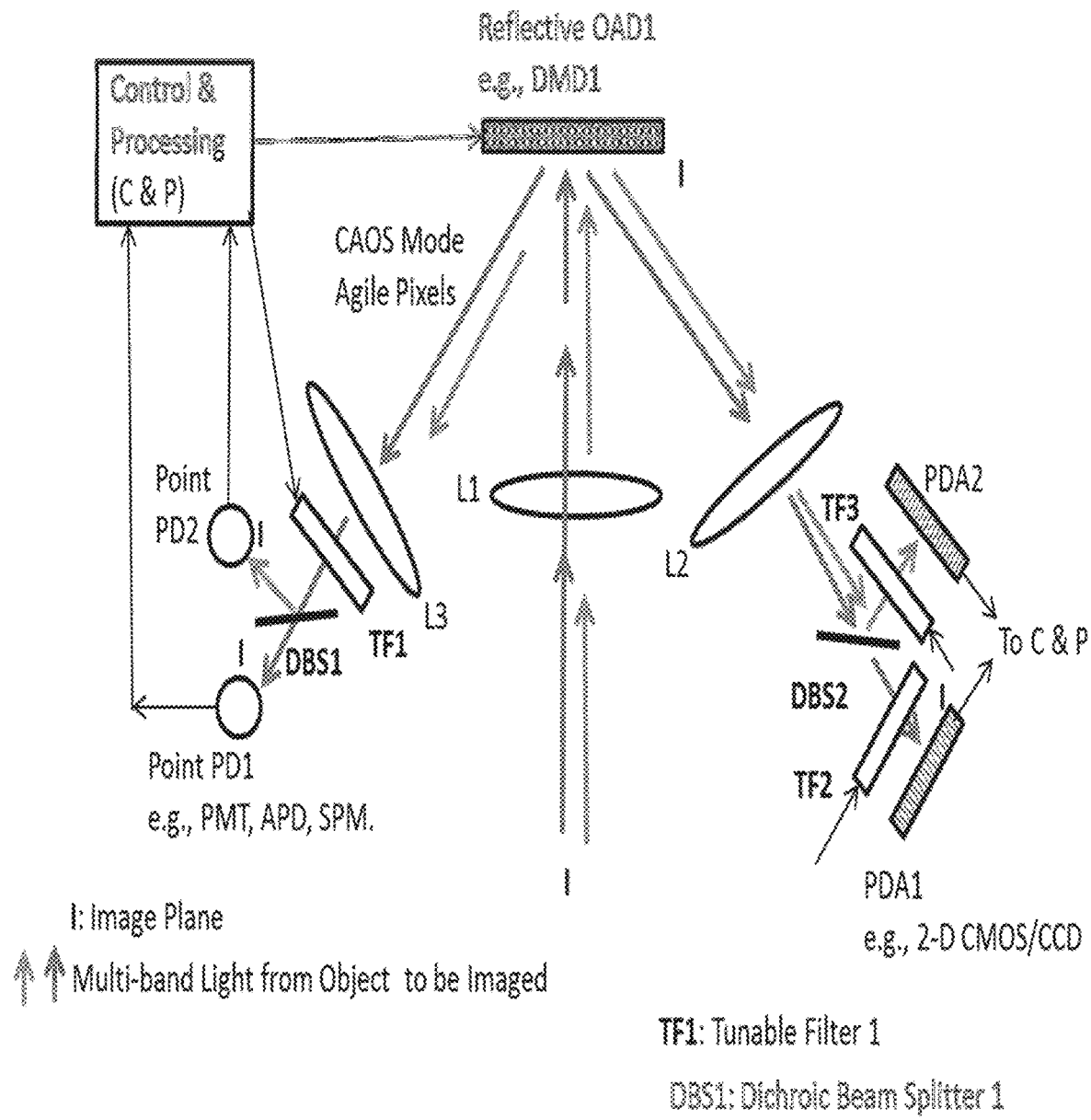
FIG. 2 shows one embodiment of a CAOS camera design using a reflective Optical Array Device (OAD) for multi-band imaging shown for two optical bands (a green color band and a red color band)
Figure 3:
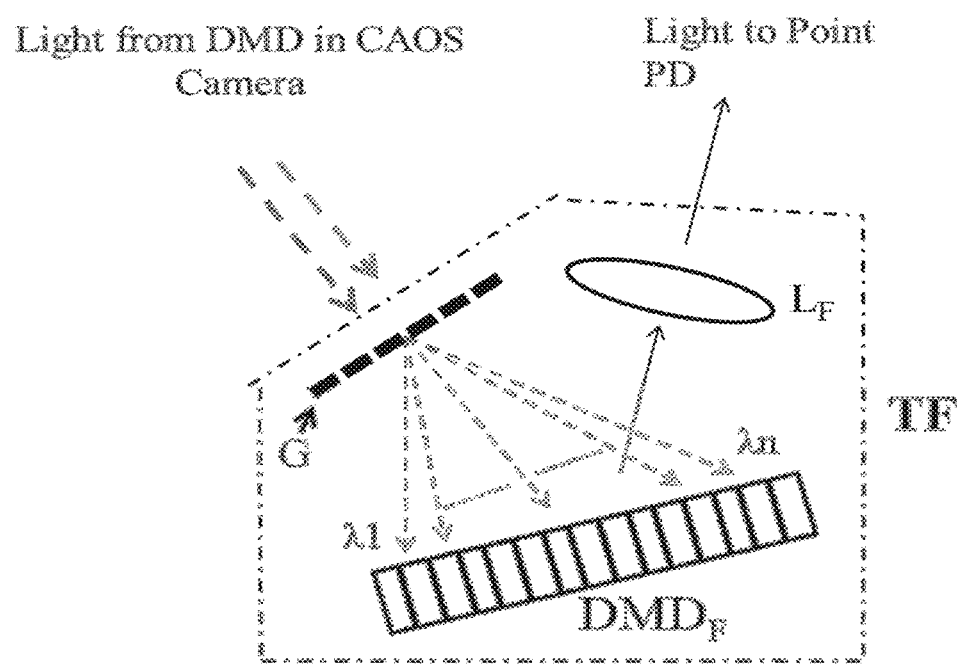
FIG. 3 shows one embodiment of a DMD-based Tunable Filter (TF) design for CAOS mode operations of the FIG. 2 CAOS multi-band camera using TF's within the wavelength bands of the incident light.
Figure 17:
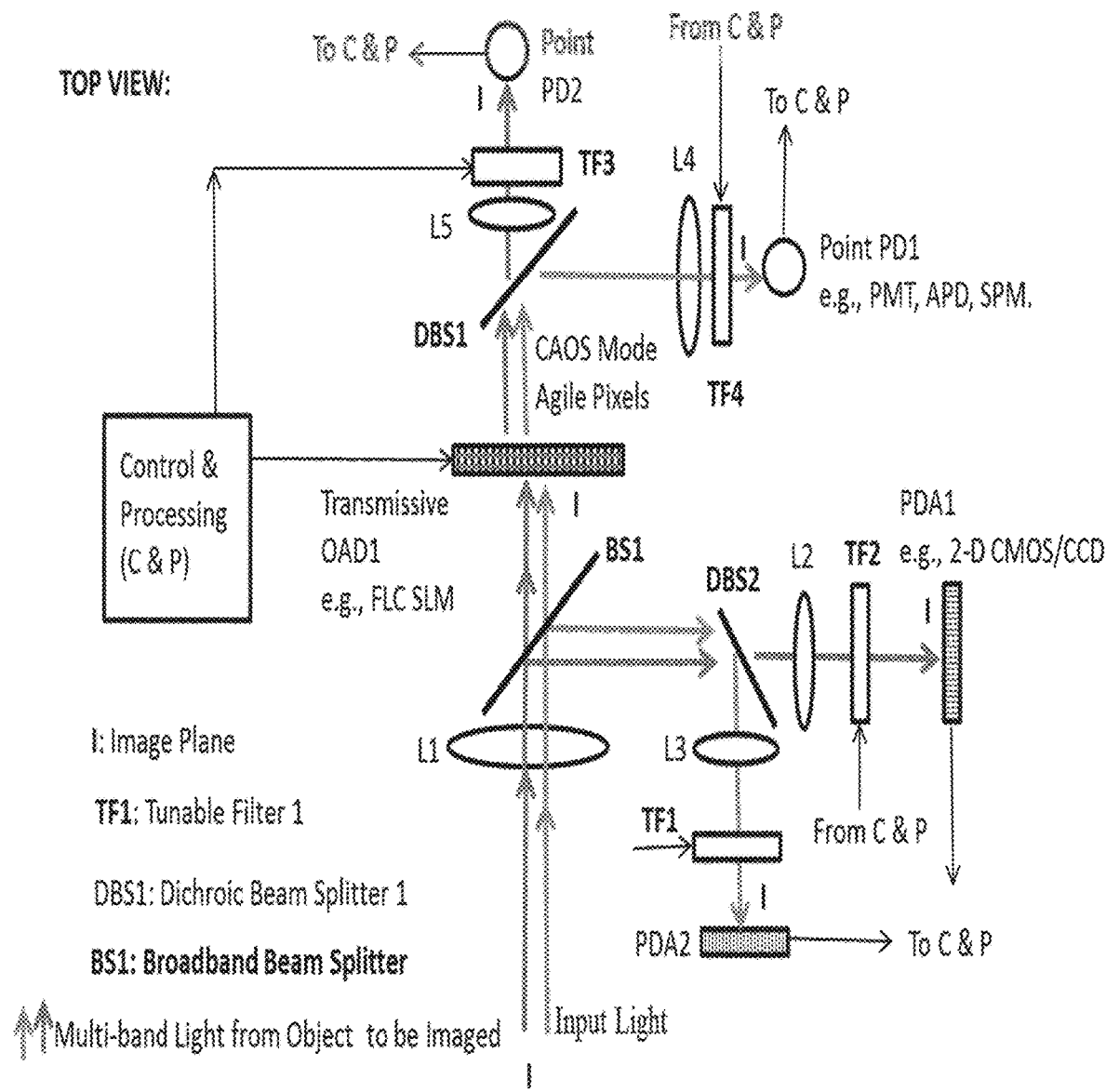
FIG. 17 shows one embodiment of a CAOS camera design using a transmissive OAD for multi-band imaging shown for two optical bands (a green color band and a red color band)

FIG. 2. shows a preferred embodiment of a CAOS camera design using a reflective OAD for multi-band imaging shown for two optical bands, e.g., a green color band and a red color band. DBS1/DBS2 are fixed broadband dichroic beam splitter filters. TF1/TF2/TF3 are tunable optical filters. PDA1/PDA2 are Photo-Detector Array Devices. PD1/PD2 are Point detectors. L1/L2/L3 are imaging lens. I: image plane or light from imaged object plane. Data from PDA1 and PDA2 guide the multispectral CAOS mode. TFs can be programmed to block or pass specific spectral channels. FIG. 3 shows an example TF design using a DMD called $DMD_F$ which receives light from a Grating or wavelength dispersion element G. $DMD_F$ can be programmed in the CAOS T-F modulation mode to provide CAOS-mode coding of the specific wavelength channels of the selected agile pixels (already CAOS coded by DMD1 in the FIG. 2 camera), thus producing double CAOS-mode coded light at the point PD. FIG. 17 shows an alternative embodiment of the CAOS camera design of the present invention which shares the same principles as the design of FIG. 2, but which uses a transmissive OAD (such as for example a FLC SLM) rather than a reflective OAD as shown in FIG. 2.

Figure 4:
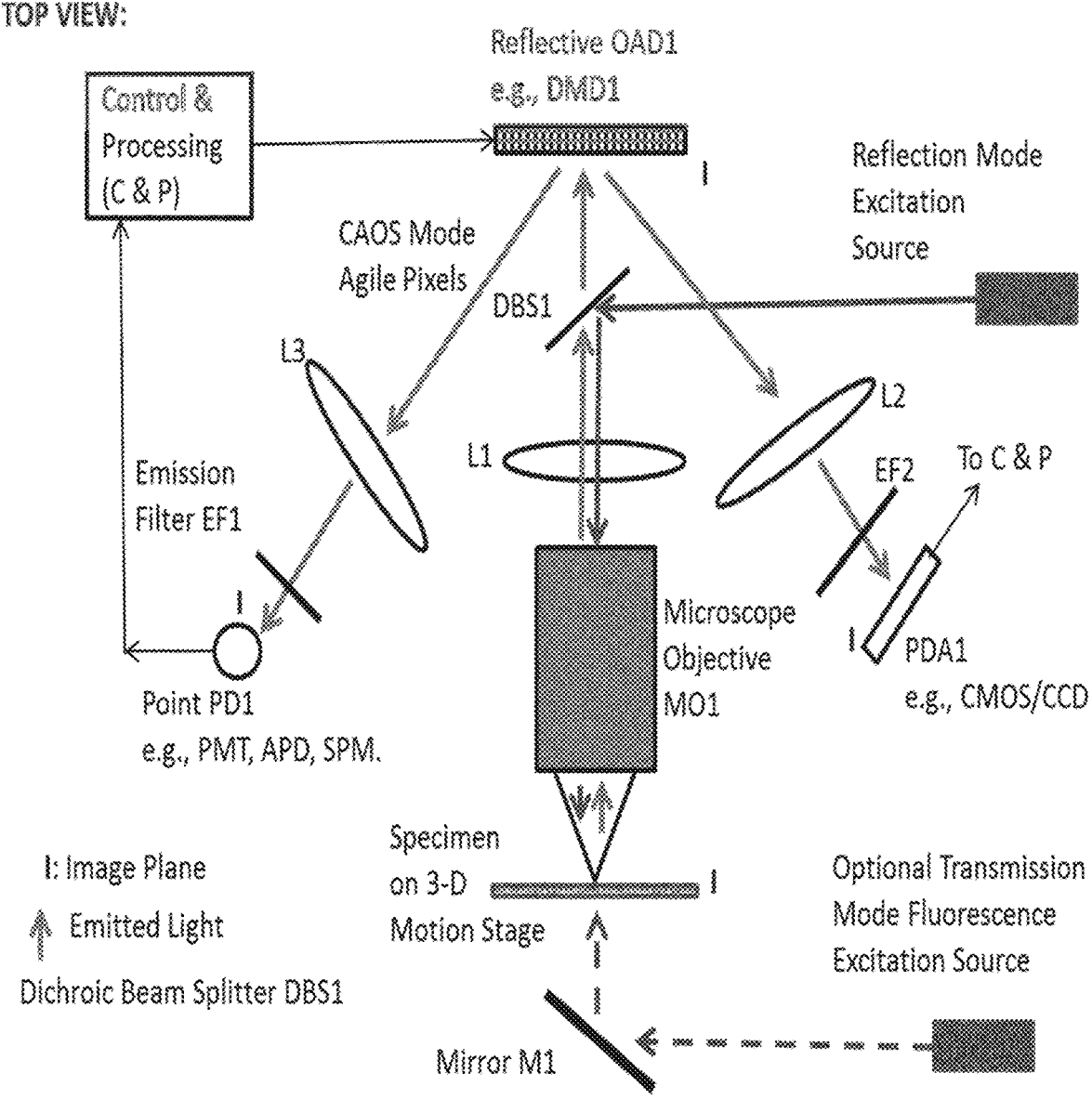
FIG. 4. shows one embodiment of a CAOS Smart Fluorescence Microscope/Nanoscope.
Figure 5:
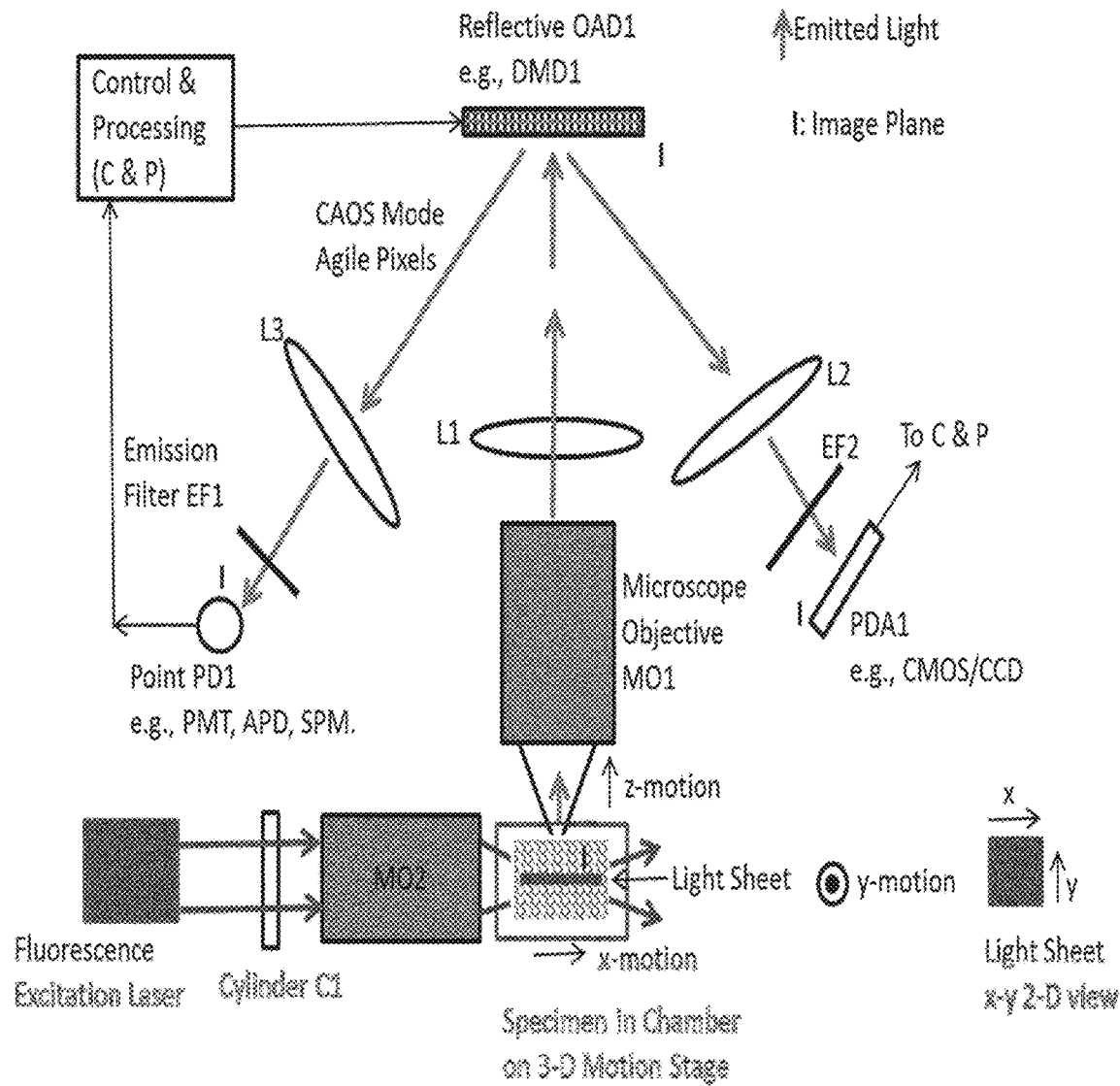
FIG. 5. shows one embodiment of a CAOS Smart Fluorescence Light Sheet Microscope/Nanoscope for 3-D Imaging.

The CAOS camera platform can also be configured to form optical microscopes and nanoscopes for both 2-D and 3-D imaging of biological and other specimens. Fluorescence microscopy and nanoscopy is a powerful tool in medical imaging and FIG. 4 and FIG. 5 show designs for a CAOS smart fluorescence microscope and a CAOS nanoscope. In both cases, designs are shown using a reflective OAD, e.g., a DMD. The transverse (x-y) resolution in the classic sense for both these designs is given by the OAD pixel size, assuming the objective and tube lens (L1) optics is diffraction limited. If each OAD pixel in the CAOS-mode T-F modulates a single fluorescence emission from a specimen spatial emission site that is smaller than the classic Abbe diffraction limit, then the CAOS microscope can function as a nanoscope, as it has collected light from a nanoscale emitter. Coupled with 3-D nano-motion stages, a full 3-D nanoscale image is possible if controlled emissions are generated from the specimen.

The FIG. 5 design engages light sheet microscopy to enable 3-D imaging with the CAOS platform, although other 3-D imaging designs such as confocal and wavelength multiplexed access are also possible. Note that again CAOS works in collaboration with the classic 2-D sensors (e.g., CCD, CMOS, etc) to extract the needed biological target information via CAOS-mode to enable extreme dynamic range low crosstalk imaging. Multiple CAOS-mode agile pixels can be simultaneously engaged by the user for efficient image data extraction. The FIGS. 4 and 5 designs also apply to traditional non-fluorescence microscopes. As active laser illumination is used, one can also time-frequency modulate the laser and engage time-of-flight (TOF) 3-D imaging techniques with the T-F CAOS-mode framework to extract fine 3-D imaging information from the target specimen. This principle of combining TOF with T-F CAOS-mode spatial imaging also works for far-field targets using classic camera lenses for far-field imaging (versus the microscope objective for nearer field imaging).

Figure 6:
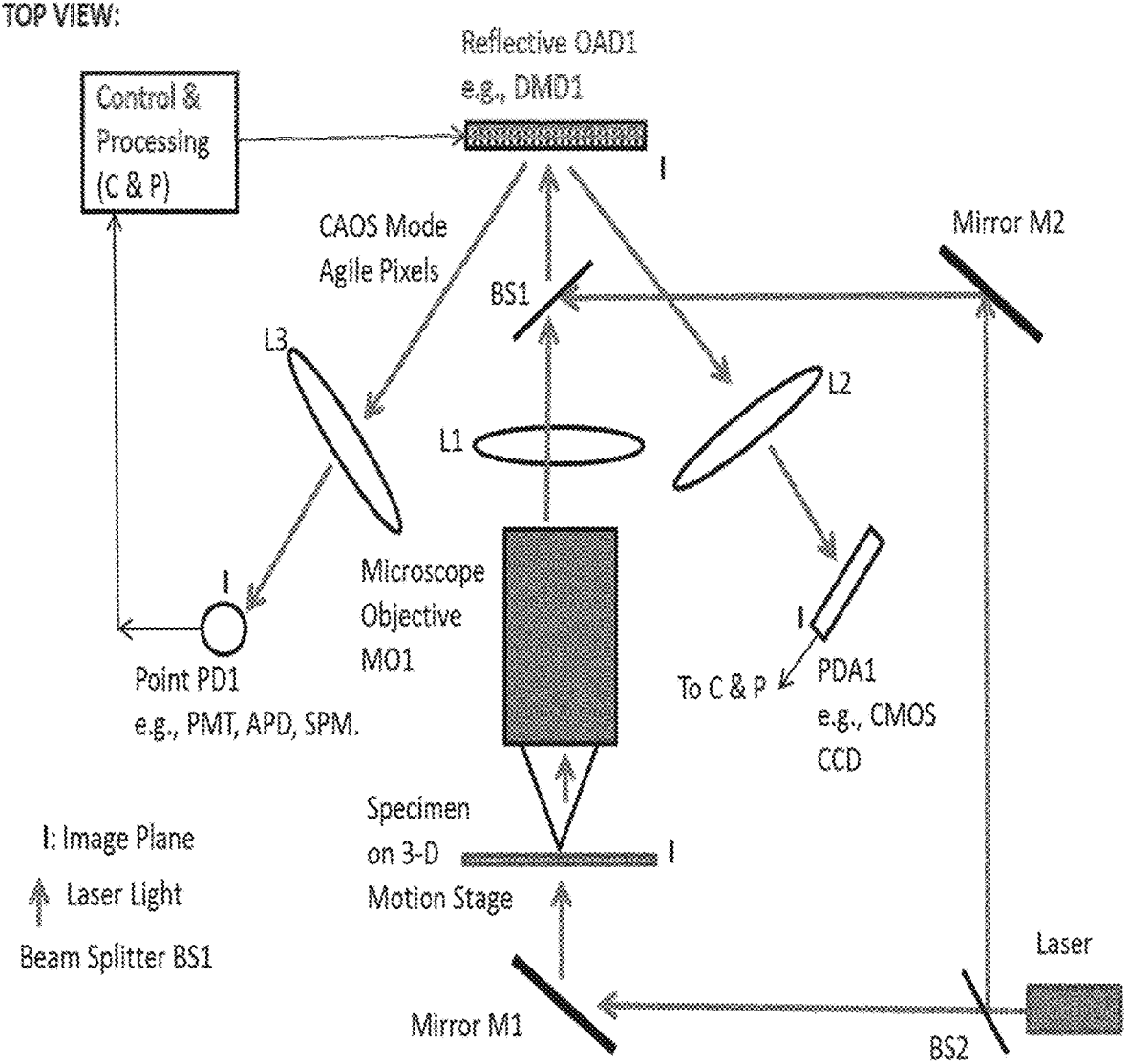
FIG. 6. shows one embodiment of a CAOS Smart Digital Holography Microscope.

FIG. 6. shows an embodiment of a CAOS smart Digital Holography (DH) microscope using a Mach-Zehnder type interferometer design. DH produces high contrast interferograms where the CAOS-mode can be a powerful method to extract extreme dynamic range digital hologram data to assist the classic PDA DH sensor to enable smarter DH-based imaging.

Figure 7:
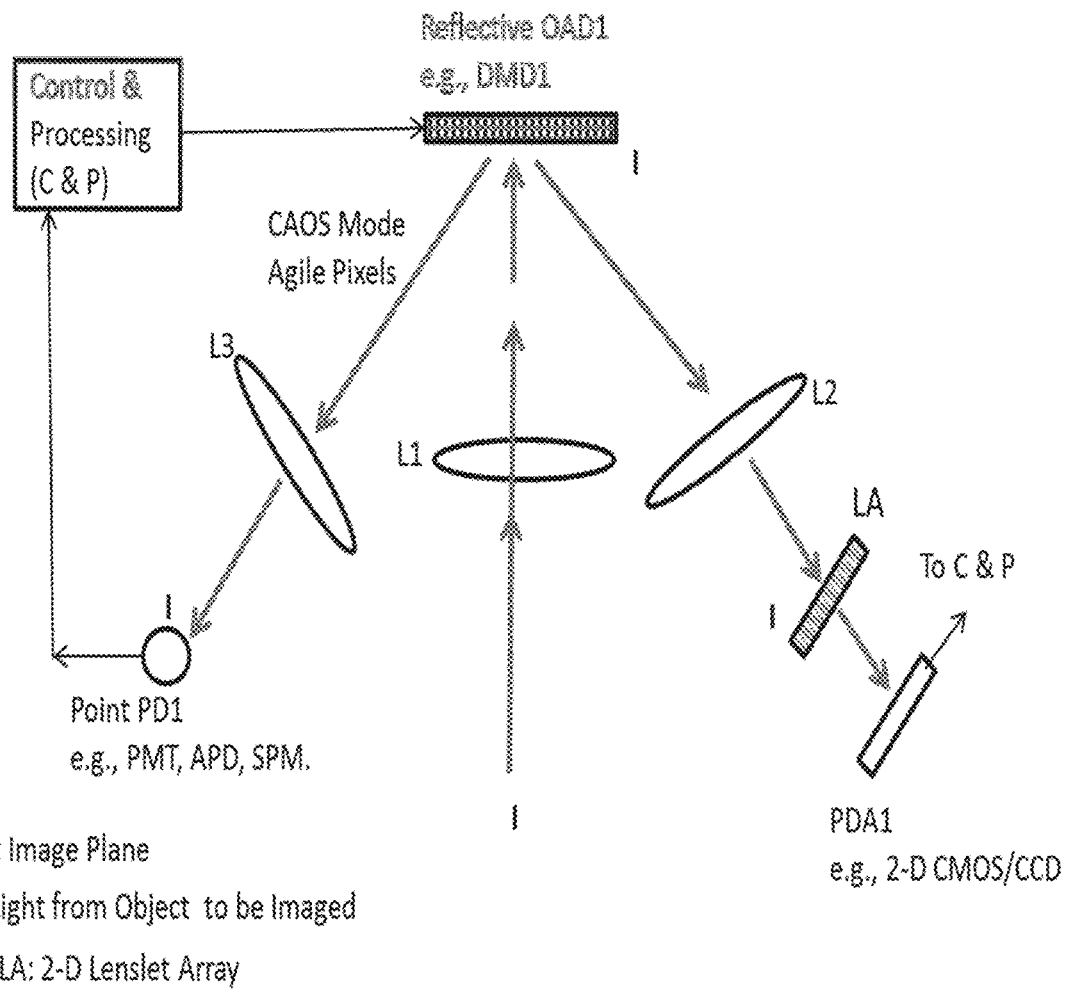
FIG. 7 shows one embodiment of a CAOS Smart Plenoptic camera.

FIG. 7 shows an embodiment of a CAOS plenoptic camera (basically like integral photography done by Lippman in 1908). This embodiment is achieved by inserting a lenslet array LA between the PDA and PDA arm imaging lens in the CAOS camera. The main imaging lens focuses the scene image on the lenslet array. Each sub-image on the lenslet array is captured by a PDA pixel set, and all these sub-images undergo image processing to produce a focused overall image of the scene with an extended depth of field. In classic cameras, a larger depth of field is obtained using a smaller aperture imaging lens but this causes reduction in light levels. The plenoptic camera design achieves the extended depth of field while still using a larger aperture imaging lens, and so is useful for high speed (or small aperture) photography.

Figure 8:
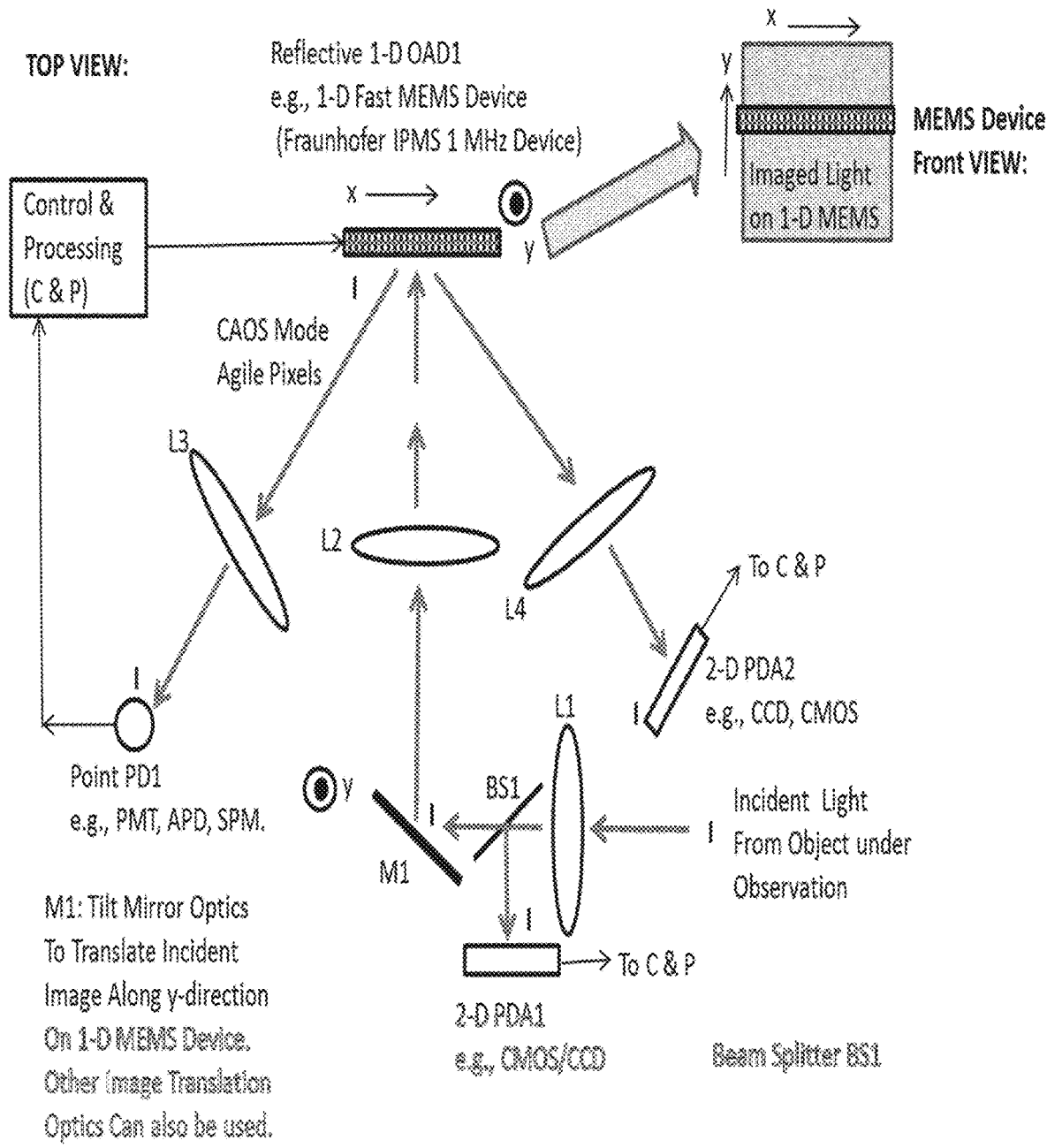
FIG. 8. shows one embodiment of a fast frame rate CAOS smart Camera using a fast frame rate 1-D OAD/SLM.

In some applications, very fast camera frame rates are required. In such a scenario, FIG. 8. shows a preferred embodiment of a CAOS smart Camera using a fast frame rate 1-D OAD/SLM (e.g., the 1 MHz frame rate 1-D analog tilt micromirror array MEMS device from Fraunhoffer IPMS Dresden, Germany) to generate the fast response Time-Frequency (T-F) coded simultaneous agile pixels across one image line at a time. This is possible as the incident light image (blue square shown in the FIG. 8) is translated across the 1-D OAD front face to implement fast CAOS-mode T-F agile pixel encoding of the many selected agile pixels on the incident light image, one image line at a time. The image translation optics to translate the incident 2-D image can be a mechanical optic (e.g., a tilting/rotating mirror as shown in FIG. 8) or any other form of translation optics such as formed using moving Risley prisms and/or electronically controlled SLM devices. Given the fast frame rate of the 1-D OAD, the FIG. 8 design CAOS smart camera 2-D imaging frame rate will then be mainly limited by the speed of the incident imaged light translation optics, and not the frame rate of the 1-D OAD.

Figure 9:
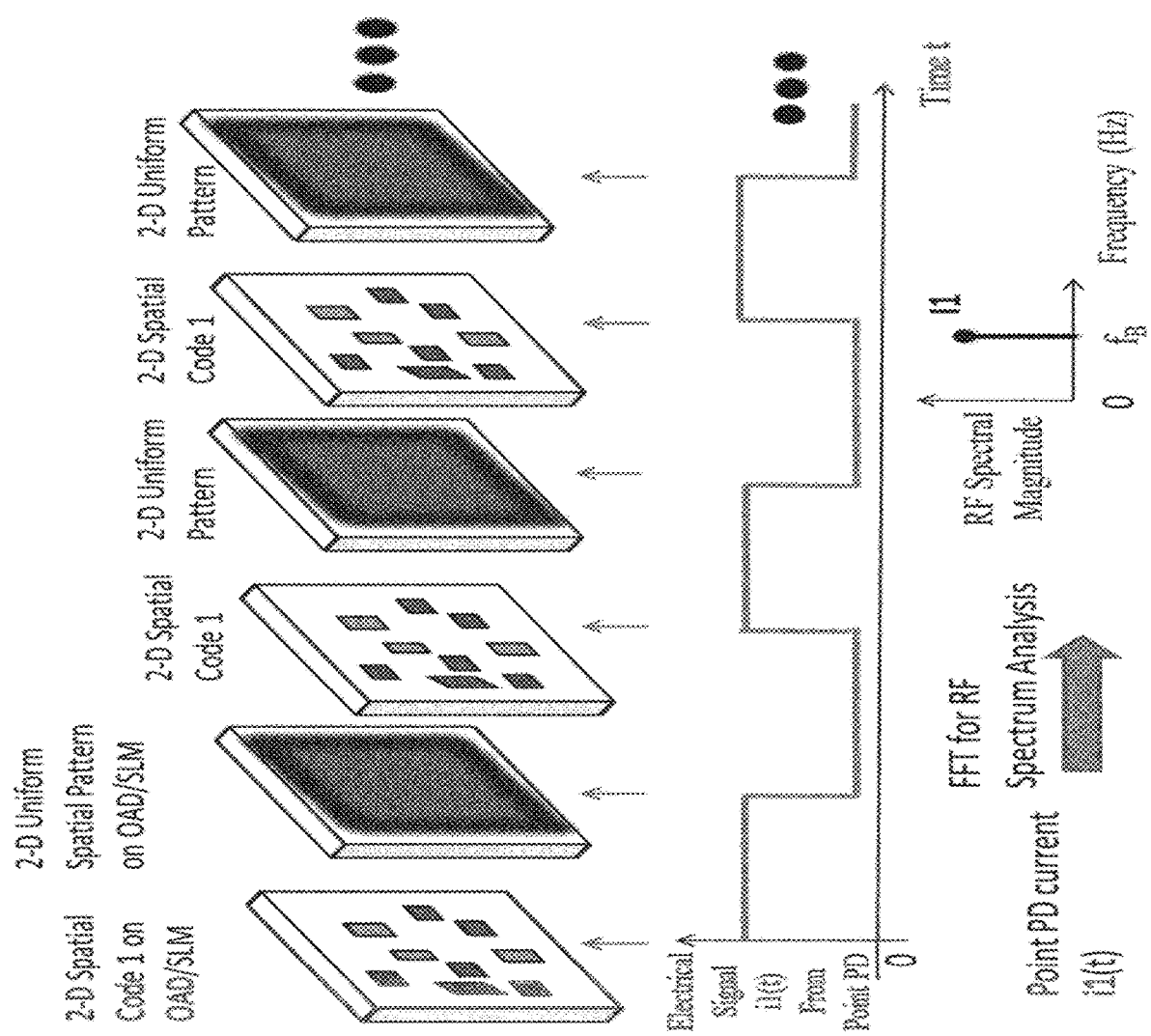
FIG. 9. shows one embodiment of a CAOS-type mode implementation of linear (e.g., Hadamard transform) and non-linear (e.g., compressive sensing) computational imaging within the CAOS smart camera hardware using the OAD/SLM and the point PD for optical intensity data capture.
Figure 10:
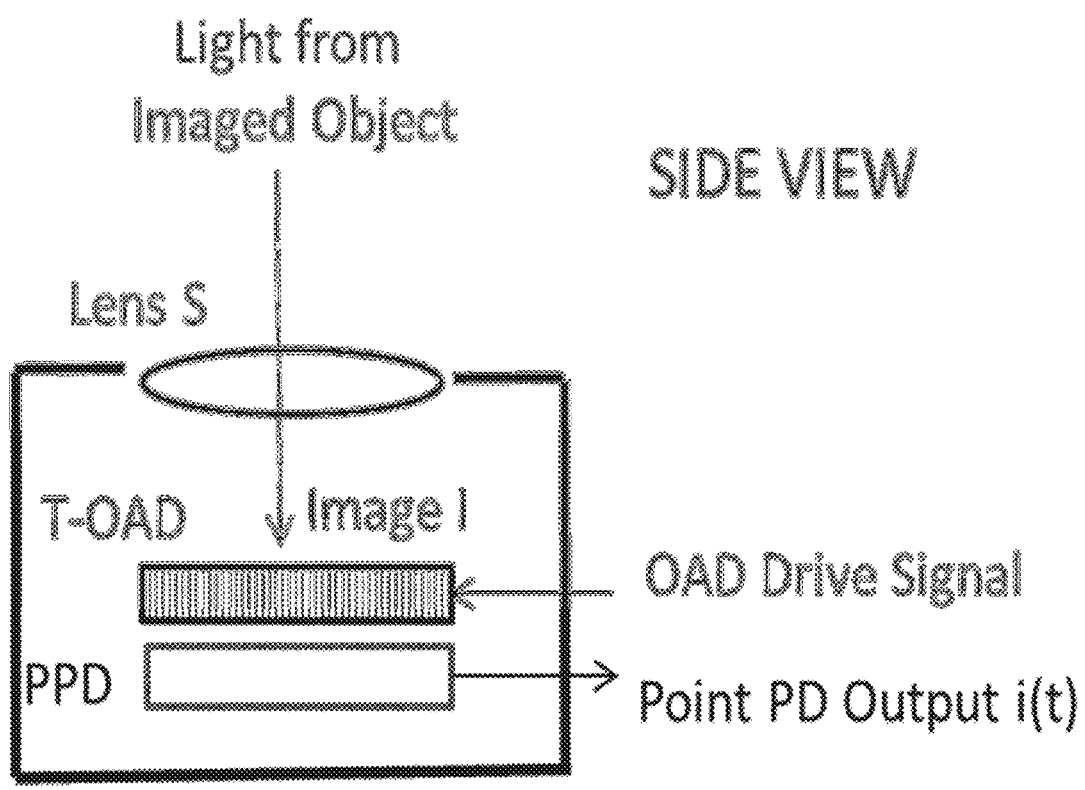
FIG. 10. shows one embodiment of a CAOS Camera super-compact design.
Figure 11:
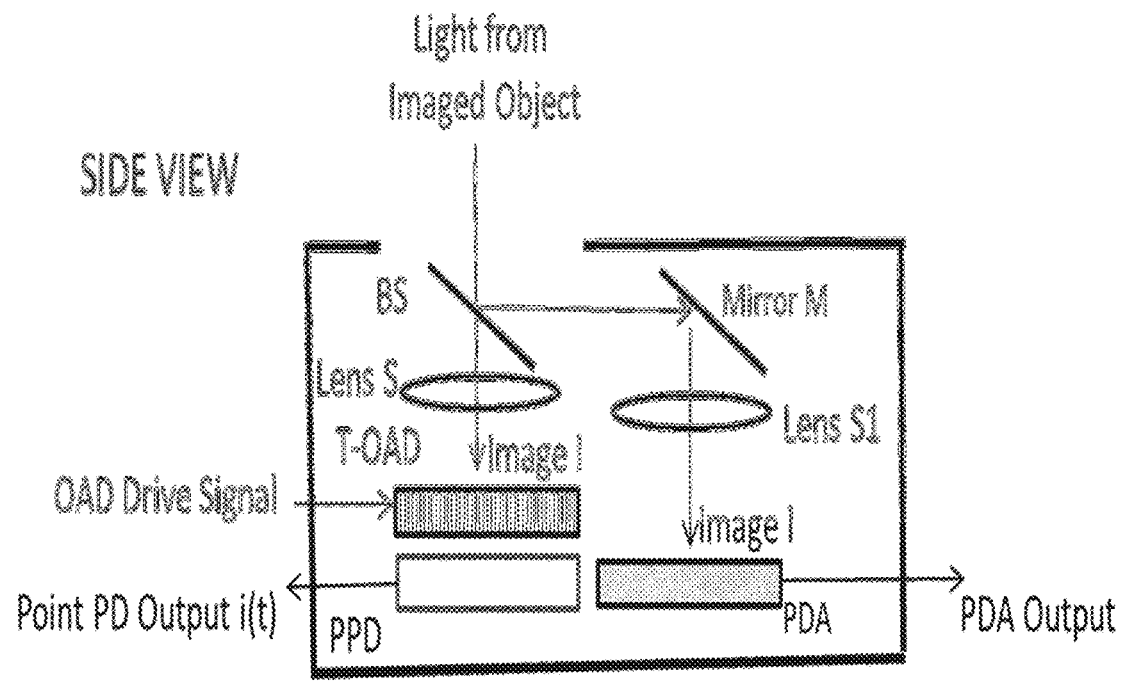
FIG. 11. shows one embodiment of a CAOS Smart Camera ultra-compact design.
Figure 12:
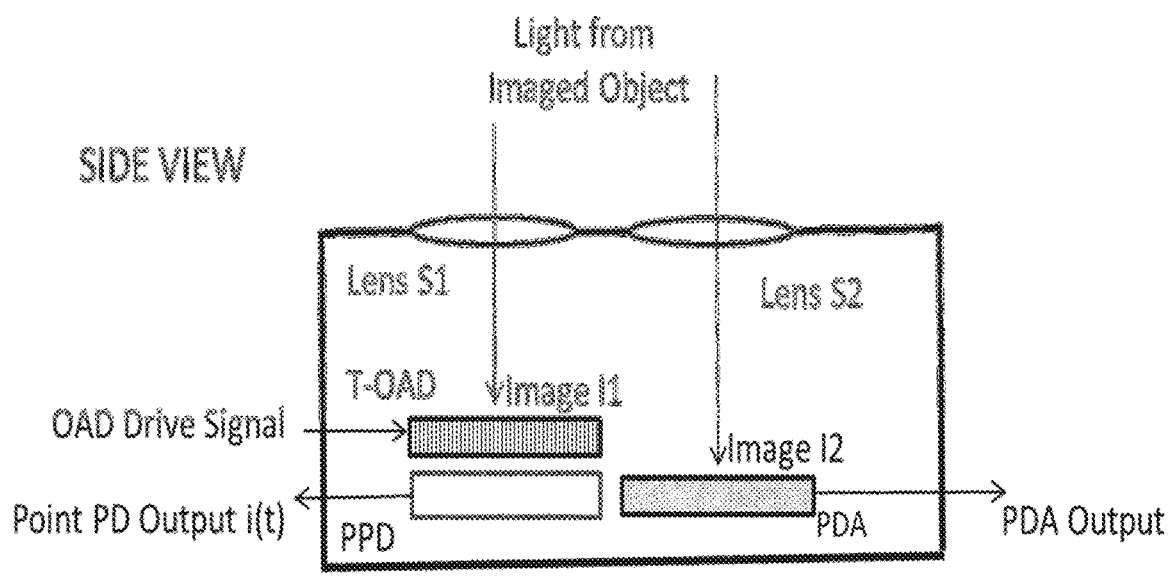
FIG. 12. shows one of a CAOS Smart Camera dual front lens ultra-compact design.
Figure 13:
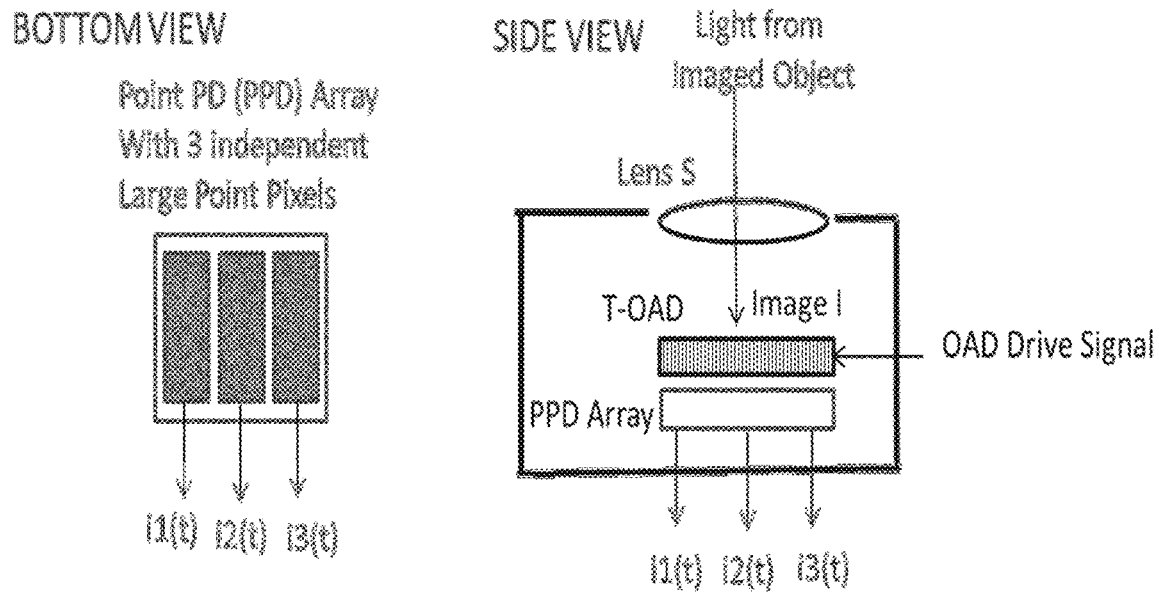
FIG. 13. shows one embodiment of a CAOS Smart Camera ultra-compact design using a multi-output point PD design that provides multiple independent PD signals (e.g., 3 shown)
Figure 14:
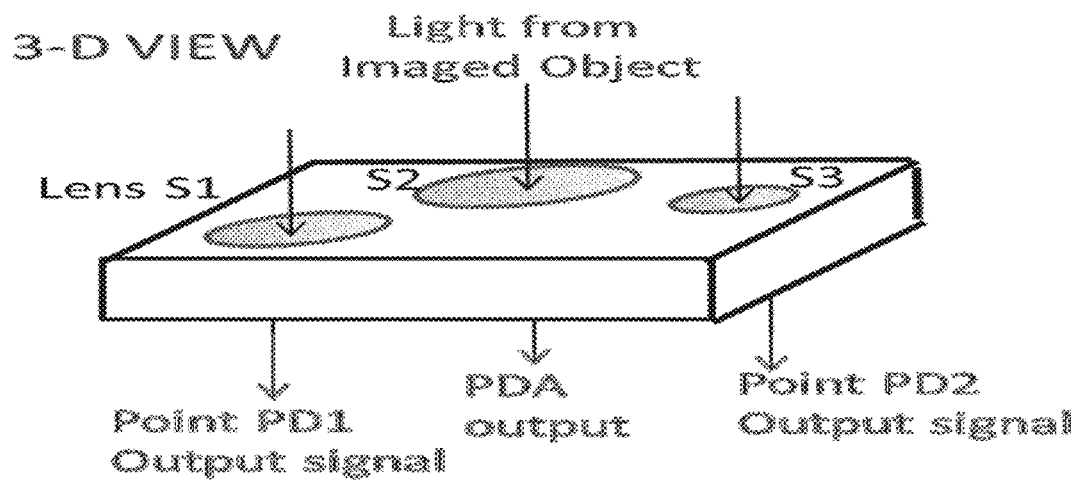
FIG. 14. shows one embodiment of a CAOS Smart Camera ultra-compact design using multiple (e.g., 3) CAOS and classic PDA camera modules using different imaging lens and optical detection packages.
Figure 15:
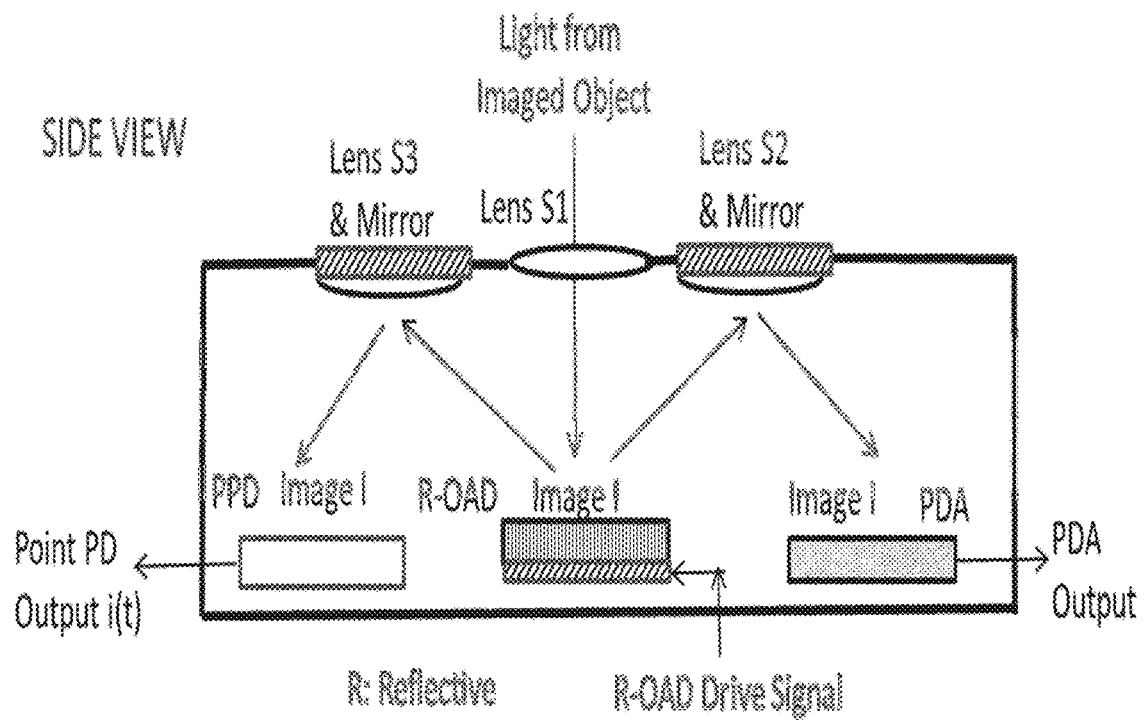
FIG. 15. shows one embodiment of a CAOS Smart Camera ultra-thin design.
Figure 16:
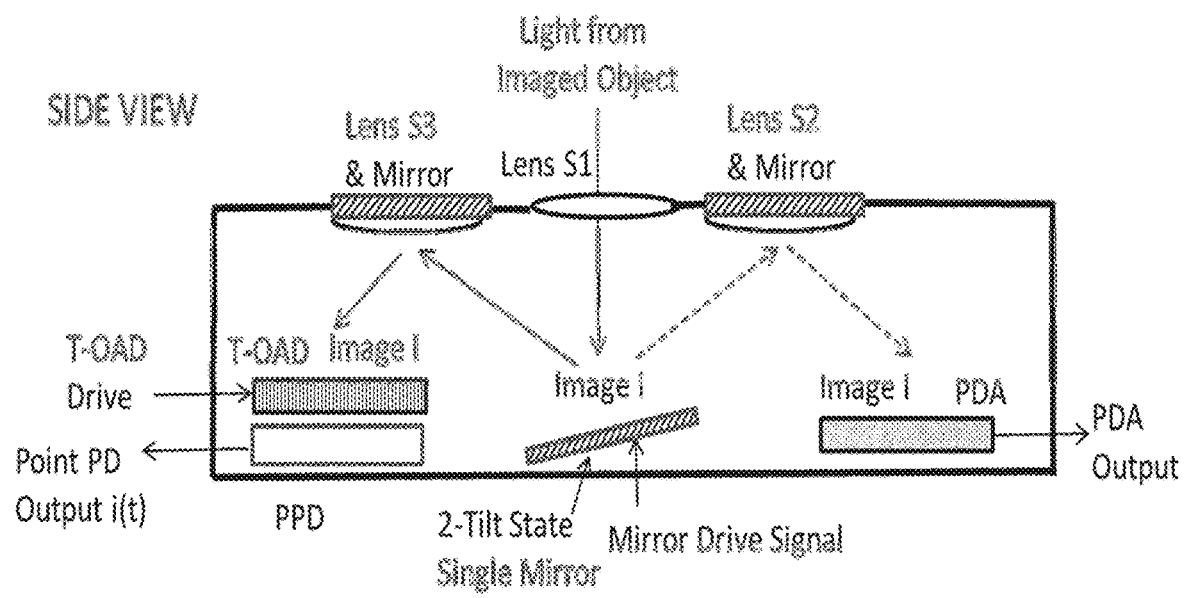
FIG. 16. shows an alternate embodiment of a CAOS Smart Camera ultra-thin design using a switchable dual tilt single larger mirror.

FIG. 9. shows a preferred embodiment of a CAOS-type mode implementation of linear (e.g., Hadamard transform) and non-linear (e.g., compressive sensing) computational imaging within the CAOS smart camera hardware using the OAD/SLM and the point PD for optical intensity data capture. The figure shows the sequence of images on the OAD/SLM needed using 2-D spatial code 1 to obtain the higher dynamic range CAOS-type optical intensity signal I1 corresponding to point PD1 generated current i1(t). Here i1(t) is an AC signal that is next subjected to RF frequency analysis to extract scaled intensity I1 from the current i1(t) produced using code 1 temporal cycling on the OAD/SLM in the smart CAOS camera.

In existing classic linear (e.g., Hadamard transform) and non-linear (e.g., compressive sensing) computational imaging, the followed time multiplexed optical data collection process is implemented within the camera hardware containing an OAD/SLM and a point PD coupled to a capture lens. Specifically, one places a specific 2-D code pattern called code 1 on the OAD/SLM that spatially modulates the incident image scene, and the 2-D spatial code 1 modulated light is then collected by a lens and captured by a point PD that gives a DC current i1 that is proportional to the captured unique intensity value I1. The current produced by the point PD is a DC signal. Next, a new specific 2-D code pattern called code 2 is placed on the OAD/SLM that spatially modulates the incident image scene, and the 2-D spatial code 2 modulated light is then collected by an lens and captured by a point PD that gives a DC current i2 that is proportional to the captured unique intensity value I2. Then another a new specific 2-D code pattern called code 3 is placed on the OAD/SLM that spatially modulates the incident image scene and the 2-D spatial code 3 modulated light is then collected by an lens and captured by a point PD that gives a DC current i3 that is proportional to the captured unique intensity value I3. This process for DC level current recordings of N different currents and collected N different intensity values is done using the N different codes. Next, the N 2-D code matrices are processed with the N different current values (representing the N different intensity values) to generate an estimate of the original incident image. Because the intensity data from the conventional cameras is collected as DC currents, the dynamic range of the estimated image by linear and nonlinear computational imaging is limited. It would be highly beneficial to generate a higher dynamic range image estimate that can also better guide the CAOS-mode of the CAOS smart camera of the present invention.

Thus FIG. 9. shows a preferred embodiment of a method to achieve this goal by engaging a CAOS-type mode implementation of linear (e.g., Hadamard transform) and nonlinear (e.g., compressive sensing) computational imaging within the CAOS smart camera hardware using the OAD/SLM and the point PD for optical intensity data capture. FIG. 9 shows the sequence of images on the OAD needed to obtain the higher dynamic range CAOS-type optical data i1(t), namely, the point PD now generates an AC signal (and not a DC signal) with a known base repetition frequency $f_B$ equal to half the frame rate of the OAD/SLM device. Specifically, FIG. 9 shows how the OAD/SLM is programmed to have the entire 2-D code 1 oscillate in time where after each OAD frame time, the OAD switches from showing the 2-D spatial code 1 to showing an optimized dummy (e.g., uniform 2-D code) spatial pattern on the OAD/SLM. By doing so over say 2M OAD/SLM device frame times, the point PD generates an oscillating AC signal that is fed to an Analog-to-Digital Converter (ADC) that produces a digitized version of the AC signal, that is next subjected to RF spectrum analysis via Digital Signal Processing (DSP) in a computer. As the AC signal has a known base frequency $f_B$ (Hz) of half the OAD frame rate, one computes the code 1 spatially modulated light intensity data value of I1 by reading the RF spectral value at $f_B$ (Hz) obtained after for example Fast Fourier Transform (FFT) digital spectrum analysis. Next, the same process is repeated in the smart camera hardware and software by using 2-D spatial code 2 and this time I2 is computed by reading the RF spectral value at $f_B$ (Hz). Next, the process is repeated using 2-D spatial code 3 to estimate I3. In summary, the mentioned process is repeated for all the N 2-D spatial codes so N higher dynamic range and improved signal-to-noise ratio (SNR) values of the N intensity I values is measured. With these improved N intensity values used with the N 2-D code values, inverse transform linear processing or iterative compressive sensing is implemented to get the better dynamic range and SNR estimates of the incident light imaged scene observed by the smart CAOS camera.

FIGS. 10 to 16 show various embodiments of a CAOS smart camera super-compact ultrathin designs suitable for portable imaging handheld applications, in a similar style to smart phones. Various folding optic designs are used engaging mirrors, lenses, both transmissive and reflective OAD/SLM devices, point PDs, PDAs, beam splitters, etc. The FIG. 12 design shows that a point PD can be used that is made up of three independent point PDs to improve CAOS agile pixels crosstalk levels. Some designs have multiple lenses and these can have different aperture sizes and focal lengths to acquire various image views with different depths of fields and using computational image processing to make one smarter image. In addition, a variety of point PD, OAD and PDA sizes, wavelengths, and pixel resolutions can be used in the designs for these ultra-thin and compact CAOS cameras. The basic idea is that multiple CAOS and non-CAOS camera modules can work together within one camera hardware to produce a better image of the viewed scene using software to combine the various images provided by the independent camera modules.

FIG. 2 showed one embodiment of a CAOS camera design using a reflective OAD (e.g., DMD) for multi-band imaging shown for two optical bands (a green color band and a red color band). Using the same basic design approach and general component notations, FIG. 17 shows one embodiment of a CAOS camera design using a transmissive OAD for multi-band imaging shown for two optical bands (a green color band and a red color band). For example, the transmissive OAD can be a fast frame rate Ferroelectric Liquid Crystal (FLC) SLM or a Multi-Quantum well (MQW) SLM or a Nematic Liquid Crystal (NLC) SLM. In the FIG. 17 design versus the FIG. 2 design, a broadband beam splitter BS1 is required to split the incoming light into two portions, one going into the arm containing the transmissive (T) OAD with the two point PDs called PD1 and PD2 while the other portion of the light going to the arm with the two PDA sensors called PDA1 and PDA2. Dichroic beam splitters DBS1 and DBS2 are used in the arms to separate the 2 different bands of light spectrum shown via red and green color beams. Before each point PD and PDA, a separate TF is used to selected unique finer wavelengths. Spherical lenses L1, L2, L3, L4, L5 are used to image input incident light onto the point PD and PDA planes. Compared to the FIG. 2 design, each point PD channel has its own narrower band TF and wavelength band matched imaging lens. In addition, compared to the FIG. 2 design, each PDA channel has its own narrower band wavelength band matched imaging lens.

It will therefore be understood that in prior art spatial Hadamard transform imager design using "1" and "4" value codes from an N×N Hadamard matrix, one uses P=N with $N=2^n$ where n=1, 2, 3, 4, 5 etc with P being the number of simultaneously viewed pixels in the image space of the imager and N being the number of spatial mutually orthogonal binary code patterns encoding the P-pixel image space. N=P is also the number of point Photo-Detector optical power readings required to create the viewed image frame.

The non-flexibility of this Hadamard imaging approach can be illustrated by an example that has P=811 pixels in the image and requires N=811 as P=N. This means a N×N or 811×811 Hadamard matrix is needed to generate 811 different codes (each code has 811 binary 1 or −1 values to spatially encode the image space of 811 pixels). As N=811 is not of order $2^n$, a 811×811 Hadamard matrix is not known to exist and so, a Hadamard transform imaging system based on 2-D spatial coding of the incident image and its P=N pixel image decoding based on inverse (or transpose) matrix processing is not possible. This becomes a fundamental limitation in Hadamard spatial transform based imaging, because P needs to be equal to N and N is equal to $2^n$. So for only specific values of integers n, i.e., for a specific pixel count $P=2^n$, a Hadamard transform imager exists.

One solution to counter this Hadamard transform imager limitation involves the addition of dummy or zero irradiance pixels in the image map. This means that in the incident image space that is exposed to mask encoding, a region (specific number of pixels) in the incident light image space should be black, i.e., have irradiance values of zero. However, this restriction puts a physical constraint on the Hadamard imager design that can impact performance. Nevertheless, if needed, through the use of dummy pixels in the image space, Hadamard imaging can be performed. For example, for a case of P=811 pixels in an incident image, a N=1024 for an N×N Hadamard matrix would be needed as N=$2^n$ with n=10 and N≥P. So in this case, as P=811 pixels, N−P=1024−811=213 dummy zero irradiance pixels would have to be added to the true P pixel image map. Furthermore, each spatial mask would have to use N=1024 coding pixels. Image recovery using inverse matrix processing applies if the matrix for decoding is a square N×N matrix, as square matrices have an inverse matrix. On the other hand, transpose matrix processing applies for decoding when the matrix is not square. In both cases, Hadamard image decoding uses a 1 and −1 value matrix. For the given example where the coding matrix is not square, one will use a 1024×811 matrix, and as such transpose processing applies. Since there are P=811 unknown pixels in the image space, P=811 coding masks are used (with 1024 coding pixels) to collect P=811 point PD readings. When considering an imaging case with P=N=$2^n$, a square Hadamard (H) matrix is used for decoding, and as the transpose of an H-matrix is also its inverse, transpose/inverse matrix processing applies for image reconstruction.

In contrast, it will be appreciated that the CDMA-mode CAOS camera of the present invention, which is based on time-based encoding and time correlation processing decoding of spatially independent P pixels, can produce a P=811 CAOS pixels image with each of the 811 CAOS pixels encoded by a N=$2^n$=$2^{10}$=1024 bits time sequence derived from a 1024×1024 Hadamard matrix. 1024 bit sequences from 811 columns (or rows) of the 1024×1024 Hadamard matrix can be used. This unique flexibility in terms of observed image P pixels, and N the number of bits in a code time sequence to encode/decode each image pixel illustrates the power of the CDMA-mode CAOS camera of the present invention versus Hadamard transform imaging, as no dummy pixels with zero irradiance need to be physically present in the incident light image space of the camera. So the Hadamard imager input scene plane should not have any stray light present in the dummy pixel scene areas where the irradiance is supposed to be zero. It should also be noted that there is no spatial correlation relationship between the incident image P pixels and the P N-bit time codes used to encode and decode each image pixel.

Another drawback of the design of the existing "pure" spatial Hadamard transform imagers, i.e., when "1" and "−1" value codes are used, is that encoding requires light processing for both the "1" and "−1" value codes, adding to the complexity of the optical imager. In the CAOS camera of the present invention, encoding can be done with "1" and "0" value codes, representing presence and absence of light, respectively. This makes for a simpler design imager. On the decoding side, one still deploys "1" and "−1" value codes, although this is performed in software. It is also possible to implement "1" and "−1" value codes in the DMD-based CAOS camera design naturally, as the DMD has two physically separated light deflection ports, where two separate point detectors can be placed to generate independent "1" and "−1" value coded electrical signals that can be electrically subtracted in noise rejection electronics (i.e. by a differential operational amplifier) or by using computer software based subtraction. Such a two point detector design for a DMD imager was originally described in U.S. Pat. No. 7,092,079, Aug. 15, 2006 by the same inventor as the present application.

Another advantage of the CAOS camera of the present invention stems from the variable coherent signal processing gain that can be used to strongly and cleanly recover a pixel's irradiance, which otherwise may be hard to optically capture due to optical and electronic noise effects. For example, where the CAOS camera operates in FDMA-mode, it engages the time domain 1-D Fourier Transform spectral analysis such as via the FFT algorithm that can produce large coherent signal processing gain for an incident image pixel extraction. In a similar manner, the CDMA-mode of the CAOS camera can deploy the use of high coherent processing gain in the time correlation operation used for the decoding of the irradiance of a pixel (for all P-pixels) in the incident image. Specifically, for an N-bit CDMA coding of the P pixels, with N an even number, a correlation processing gain of N/2 using 1 and 0 value encoding (or gain of N when using 1 and −1 value bit encoding) can be achieved for an N-bit code with N an even integer, and each code having an equal number of 1's and 0's (or −1's). The irradiance of the decoded pixel on recovery is scaled by a N/2 (or N) gain factor. With large N, this gain effect can be increased, in order to improve camera dynamic range (DR) and signal-to-noise (SNR) performance.

It should be understood that in spatial transform-based point detector imaging, the time sequential 2-D masks are mutually orthogonal in 2-D space to create orthogonal spatial basis functions (in x and y) to sample the 2-D image. However, in CAOS, the 2-D masks in time sequence do not have to create orthogonal spatial basis functions to sample the 2-D image. The 1-D code sequences encoding the irradiance pixels should be ideally orthogonal in time, so cross-correlation time processing of these codes is ideally a zero value.

In "pure" Hadamard spatial transform imaging, for a fixed number of observed pixels P, the decoding processing gain is also fixed, as gain is proportional to P=N, where N codes is used for a N×N Hadamard matrix (with"1" and "−1" values) and N=$2^n$. In this case, the number of spatial masks needed is P=N, and the number of point detector optical power readings is also P=N. In order to obtain a higher processing gain, it is necessary to increase the observed image pixel count P, which also means using a higher space bandwidth product (SBWP) mask, as the mask SBWP=P. This requirement in turn increases the total data required for mask generation, and demands a Spatial Light Modulator (SLM) with a larger pixel count. It will be appreciated that this results in an increase in the overall hardware complexity, as well as higher SBWP requirements for the imaging system. It is well known that designing an optical imaging system with a higher SBWP requires high quality optics in the system, while the processing frame time for Hadamard transform imaging is equal to the P-bit sequence time.

In contrast to "pure" Hadamard spatial transform imaging, the decoding correlation processing gain in the CAOS camera of the present invention can be variable, and is proportional to N, the number of time sequence bits in a 1-D code assigned to the image pixel in a P-pixels CAOS image. To increase processing gain, one can increase N, while making sure that N≥P, where P is the total number of pixels simultaneously being recorded in one CAOS image frame. Therefore, it is not necessary to increase the observed pixel count P to get a higher processing gain. In other words, unlike the case for Hadamard transform-based imaging mentioned above, it is not necessary to use a SLM with a larger pixel count, as the SBWP of the masks can remain unchanged and equal to the pixel count P as one increases the processing gain, by increasing N for the image pixels under observation. The processing frame time for CAOS is equal to N-bit sequence time. Using multiple CAOS frames with different N values, individual control of N per observed pixels can be used to increase processing gain for pixels that need high gain, and lower gain can be set for brighter pixels where less decoding gain is needed. These processing gain variations in the multi-CAOS frame capture approach can be taken into account in computer-based image reconstruction, in order to produce a uniform gain final CAOS image for all the observed pixels.

In "non-pure" Hadamard transform imaging, where one uses 1 and 0 value masks for spatial encoding, a non-symmetric matrix is used for image reconstruction to find the pixel scaled irradiance values, I's. Hadamard matrices are symmetric N×N, N=$2^n$, and their $1^{st}$ row/column have all 1's, and it is not possible to use this column or row to make a 2-D binary pattern that is orthogonal to all the other 2-D binary patterns generated from the remaining rows/columns of the N×N H-matrix when the coding matrix has 1 and 0 values. This is due to the fact that a mask with N=$2^n$ 1's cannot be orthogonal to N=$2^n$ points masks with 1 and 0 values. Hence, the all 1's value mask is not used, but the other N−1 (1, 0 value) masks are indeed spatially orthogonal with each other. As N=$2^n$, it means that each mask has an even number of values, so their cross-correlation with each other can indeed give a net zero sum, the definition of mask spatial orthogonality. N−1 masks can be generated, so this means the encoding and decoding matrix is a N×(N−1) matrix. In effect, here the measured pixel count is N−1, the effective pixels being sampled is N (so one pixel location in the image is assumed as a dummy zero light pixel), the mask size is N (i.e. it has N pixel codes), and N−1 are the point detector readings (i.e. there are 1023 actual image pixels under view, 1 dummy image pixel with a zero light level, 1023 masks, each with 1024 code 1/0 values, and 1023 point PD readings). If 1 and −1 values are used for encoding instead, as in the Classic H-matrix, it will be appreciated that then the N×N matrix is symmetric, the code length is N and the pixel number is also N (i.e. there are 1024 actual image pixels under view, 1024 masks each with 1024 1/−1 type code values, and 1024 point PD readings).

The CAOS smart camera of the present invention may be configured to have a number of different modes of operation. One mode of operation of the camera which was previously described above is called the baseband CDMA-mode of the CAOS camera. Here, the N-bit CDMA mode consists of each p-th pixel on the DMD creating on/off or 1 and 0 state pixel irradiance modulation in time with each bit time equal to T and the CDMA code sequence time equal to NT. In effect, the p-th CAOS pixel irradiance has its own CDMA time code sequence of N-bits (1's and 0's) that is detected as a p-th pixel optical intensity modulated electrical signal produced by the point Photo-Detector (PD). As all P CAOS pixels (P is less than or equal to N) on the DMD simultaneously experience this baseband CDMA time-based on/off irradiance modulation, the total baseband electrical signal produced by the point PD is a sum of all the P CDMA time code sequences. To recover the CAOS-mode selected P pixel irradiances of the incident image on the CAOS smart camera, each individual assigned p-th pixel time sequence N-bit CDMA code signal is separately time correlated with the sum baseband signal from the point PD with a relative time difference set to zero between the two signals. After this electronic 1-D time-based correlation processing with zero relative time delay, a scaled irradiance value (i.e., with the code bit length dependent correlation processing gain) is computed for the specific p-th CAOS pixel accessed on the DMD. In such a way using time correlation processing between the point PD baseband signal and the specific CDMA time sequence N-bit codes, all scaled irradiance values for the P-pixels are recovered.

Note that the first row or column of a N×N Hadamard matrix has all 1 values. Other rows/columns have the same 1 values and −1 (or zero) values. This means that in the CAOS camera of the present invention, if one uses this first row/column in matrix to represent the first bit in the encoding time sequences of all P CAOS pixels in the image, then the point PD signal current generated for this first bit time slot is a maximum, as it collects light from all the P pixels (because of all 1 value codes). One can use this peak observed in the photo-current to act as a natural internal time stamp in the camera for when coded access to an image frame starts for CAOS encoding processing.

Figure 18:
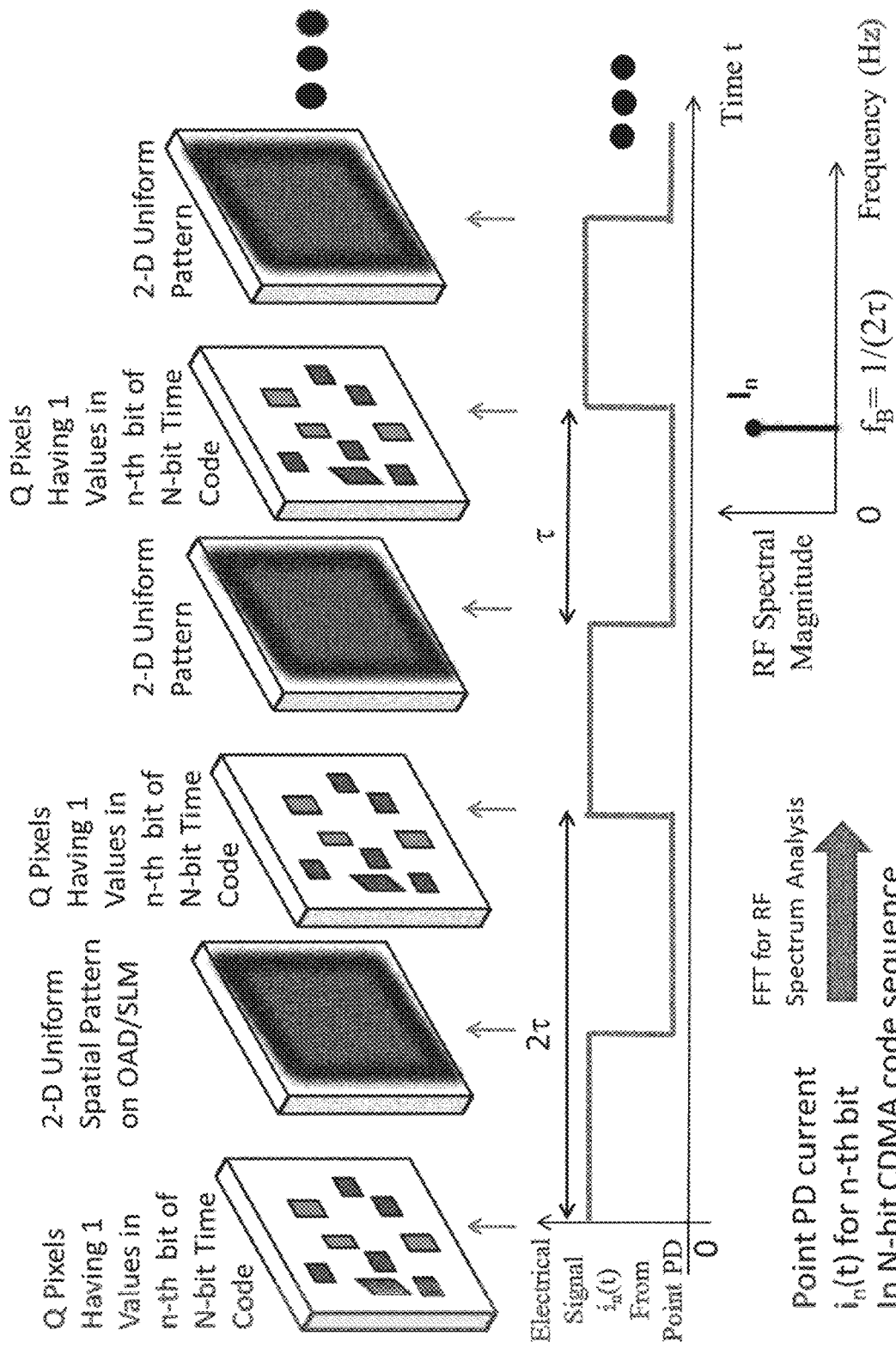
FIG. 18 shows the FM CDMA mode of the CAOS Smart Camera of the present invention.

To improve the SNR characteristics of the point PD detected CDMA electronic signal and to achieve a higher dynamic range CAOS camera, the baseband CDMA signal be transferred to a non-DC carrier frequency $f_B$ so as to reduce classic 1/f electronic noise in detection and post-processing optoelectronics and electronics, as previously described in relation to FIG. 9 above. FIG. 18 repeats this technique, but in the context of time-domain correlation based decoding for CAOS imaging, and not linear Hadamard transform based imaging or non-linear compressive processing-based imaging as described in relation to FIG. 9. Specifically, the new high DR and high SNR CDMA-mode technique, which is called Frequency Modulated (FM)-mode CDMA, is designed to recover the P irradiances selected of the incident image with N greater or equal to P. The N-bit codes for example are derived from the columns/rows of a Hadamard matrix of size K×K, where K is equal to or greater than N. Specifically, each 1 bit value in a CDMA time sequence is embedded with a carrier signal that amplitude modulates the irradiance of the specific pixel. The period of this carrier is 1/(2τ) where 1/τ is the frame update rate of the DMD used to place new spatial images. The number of full period cycles in the carrier is M and is application dependent, so a 1-bit time sequence of the pth-pixel CDMA code becomes of 2Mτ=T seconds length in time. To create a single carrier cycle, one image frame of the DMD has the 1 value codes for the P-pixels (see FIG. 18 with DMD showing P=9 pixels with the 1 value code) and the following in time sequence DMD frame is a spatially blank frame (e.g., all 0 values showing a black image on DMD in FIG. 18). As shown in FIG. 18, this sequence is repeated M times (in FIG. 18, M=3) to generate a carrier signal with M cycles with the point PD generating the electrical version of this Frequency Modulated CDMA signal. Recall that all FM CDMA-mode temporally oscillating Q pixels (Q<P; e.g., Q=9 in FIG. 18 and P could be 18) on the image simultaneously contribute to this sum FM CDMA signal for this given code bit. The pixel numbers Q and P are within the shown DMD full frame, although sub-frames or regions of interest (ROI) (also called areas of interest or AOI) can be selected within the DMD to implement the FM CDMA mode. The RF spectrum of this FM CDMA signal is generated to produce a spectrum whose amplitude value is read at the carrier $f_B$=1/(2τ) Hz value. This spectrum value $I_n$ is proportional to the sum of the Q pixels irradiance values that all had codes of 1 for the nth bit in the code. Recall the time code has N-bits, so this process has to be repeated for all N bit times to generate N $I_n$ values that are used to create a high SNR and a high dynamic range baseband CDMA signal representing the point PD generated signal, that is next subject to time correlation processing to recover the scaled original irradiances of the P-pixels FM CDMA coded and observed in the scene. As no bit slot in time when simultaneously looking at all P pixels would result in all code bit values being 0 (i.e., Q is not equal to zero), all DMD frames representing bit codes will have 1 values, guaranteeing the cyclic carrier in time. Note that if there are N-bits in each CDMA time sequence code, it will take $NT=NM2\tau$ seconds to acquire the full P-pixel frame point PD data for decoding processing. Thus, all the parameters N, M, $\tau$ have to be chosen to suit the desired CAOS CDMA mode in operation best matched to a given imaging application and/or scene.

The technique shown in FIG. 18 engaged FM CDMA with a specific $f=f_B$ Hz for the 1 value state of the bit in a CDMA time sequence code. It is also conceivable that another frequency $f=f_{B0}$ Hz can be assigned for the 0 value state of the bit in the FM CDMA-mode time sequence code. In this case, the two carriers $f_B$ Hz and $f=f_{B0}$ Hz should have minimal overlap in the RF spectrum, in order that the sum of all Q pixel irradiances with the 1 code can be read as well as independently reading all the other P-Q pixel irradiances given the 0 code in a specific bit in the N-bit sequence. In this way, both the 1 coded pixel irradiance sum and the 0 coded pixel irradiance sum can be read with high SNR and dynamic range.

Another point to note is that the DMD-based CAOS camera has two physically separated ports for placing two point PDs, so two separate CDMA coded signals can be generated by the two separated point PDs. These signals can be subtracted electronically using custom electronics, or subtracted after analog-to-digital conversion (ADC) in computer-based software to produce even lower noise and higher dynamic range signals needed for P-pixel irradiance electronic processing based decoding.

Figure 19:
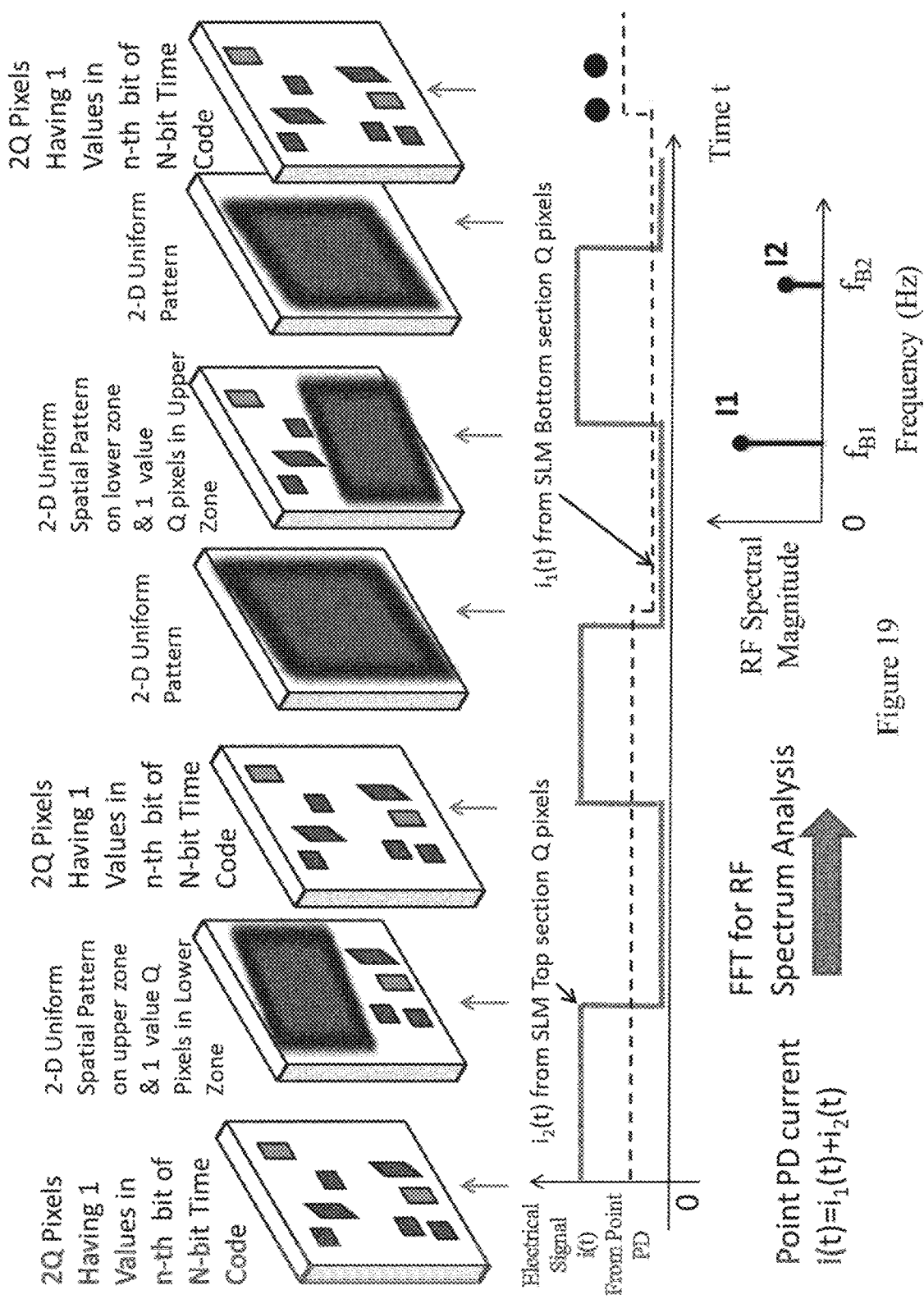
FIG. 19 shows an embodiment of the CAOS camera of the present invention where the camera is operating in FDMA-CDMA mode with two FDMA channels allocated to two independent sets of Q each CAOS pixels on the DMD plane. The CAOS pixels (shown as Q=4 pixels in each set) use the same CDMA code sequences, although the code bits are modulated at different frequencies, namely, $f_{B1}$ and $f_{B2}$ Hz.

FIG. 19 shows one embodiment of the CAOS camera of the present invention, where the camera is operating in FDMA-CDMA mode with two FDMA channels allocated to two independent sets of P each CAOS pixels on the DMD plane. The CAOS 1 value bit state pixels (shown as Q=4 pixels in the upper half of DMD and Q=4 pixels in the lower half of DMD) in each set use the same CDMA code sequences, although the code bit 1 values in the N-bit sequences are modulated at different frequencies, namely, $f_{B1}$ and $f_{B2}$ Hz. In this embodiment, Q is the number of pixels in each half of the DMD frame with a 1 value code bit. The RF spectrum peaks at $f_{B1}$ and $f_{B2}$ Hz of the point PD signal gives the scaled irradiances $I_1$ and $I_2$, respectively. These scaled irradiances acquired one bit at a time over N-bits are used to construct the two different N-bit coded high SNR and high dynamic range point PD signals for the two P pixel sets (Q<P) that occupy the upper and lower areas of the DMD, which are required for time correlation processing and pixel decoding. The FDMA-CDMA mode shown with two RF carrier channels doubles the CAOS CDMA pixel count using the same N-bit CDMA code sets for both the P pixel sets, thus making a code efficient camera. The $f_{B1}$ and $f_{B2}$ Hz values should be chosen so there is minimal spectral overlap and crosstalk between these two fundamental frequencies.

Figure 20:
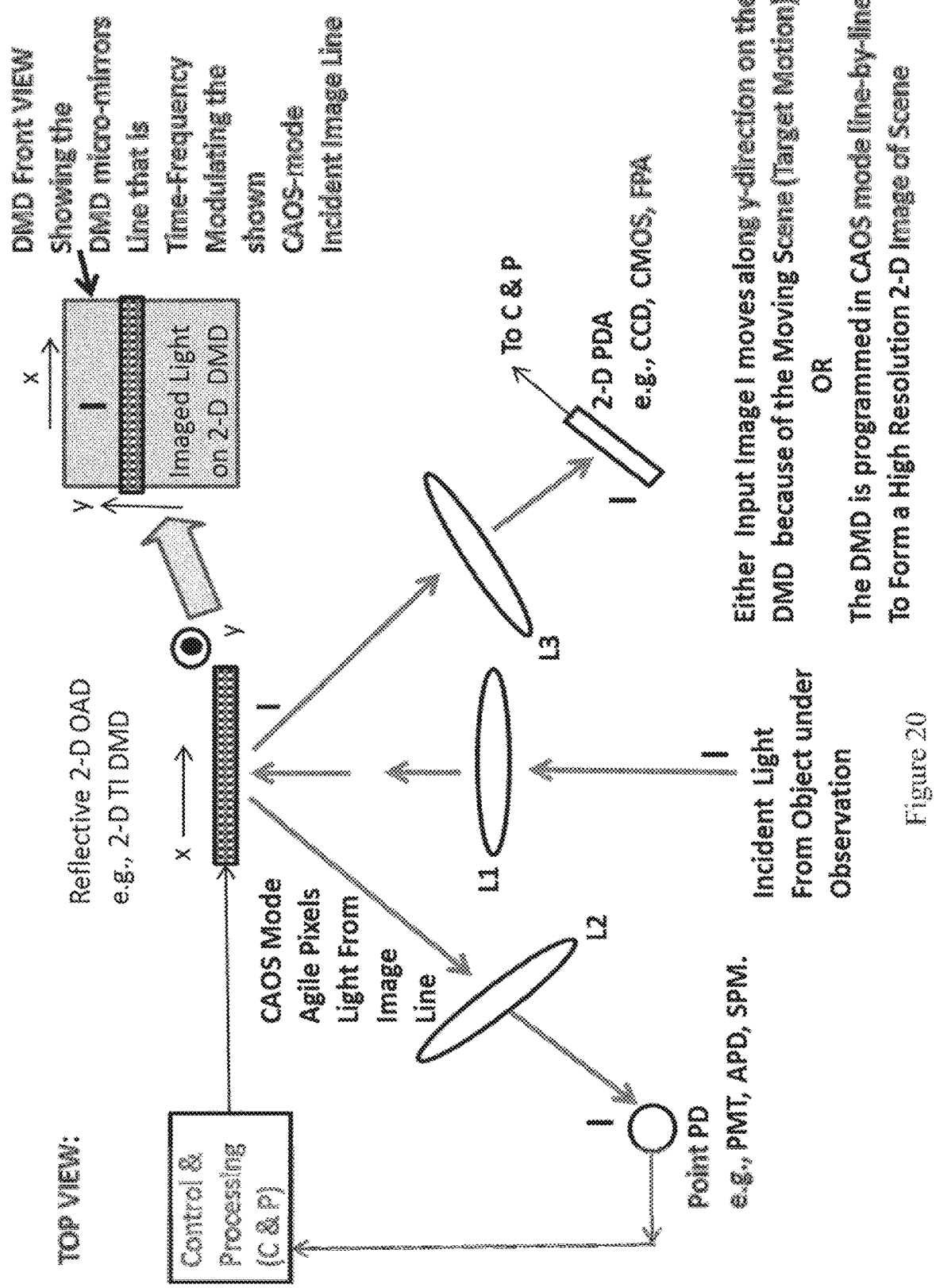
FIG. 20 shows one embodiment of a CAOS Line Scan Camera using a 2-D DMD.

FIG. 20 shows an exemplary line-by-line scan imaging design using a 2-D DMD-based CAOS smart camera which is programmed as a time-frequency modulating spatial image line that can produce high spatial resolution and pixel count images for 2-D object scenes, including 2-D scenes with linear motion. Specifically, each line of micromirrors in the DMD is programmed to operate in the CAOS time-frequency modulation mode one line at a time scanning spatially from the top DMD line to the bottom DMD line. If the region of interest (ROI) on the DMD is a smaller part of the DMD area, the line length and positions are adjusted to match the need of an application. If the scene imaged onto the DMD involves a moving target scene with motion, the same single line on the DMD operates in the CAOS mode. In this case, a 1-D DMD with a single row of micromirrors can enable the design of a line scan CAOS camera. The CAOS smart camera in general, and specifically the CAOS line scan camera, can be used for the tracking of moving objects in a HDR scene, as a smaller amount of pixels in the scene cover the moving object and its track, and hence the fewer CAOS pixels in the camera (versus CMOS sensor or other PDA sensor pixels) can image the target and its track with fast speed and high spatial resolution. CAOS camera imaging is also suited for underwater HDR scenes, where one has both bright lights to illuminate the scene and the hidden dark objects. In FIG. 20 the reference L denotes a spherical lens, "I" denotes the incident image or a replica of it at a lens-based image plane, and the PDA is a 2-D photo-detector array device, such as for example a CMOS/CCD/FPA optical sensor chip.

Figure 21:
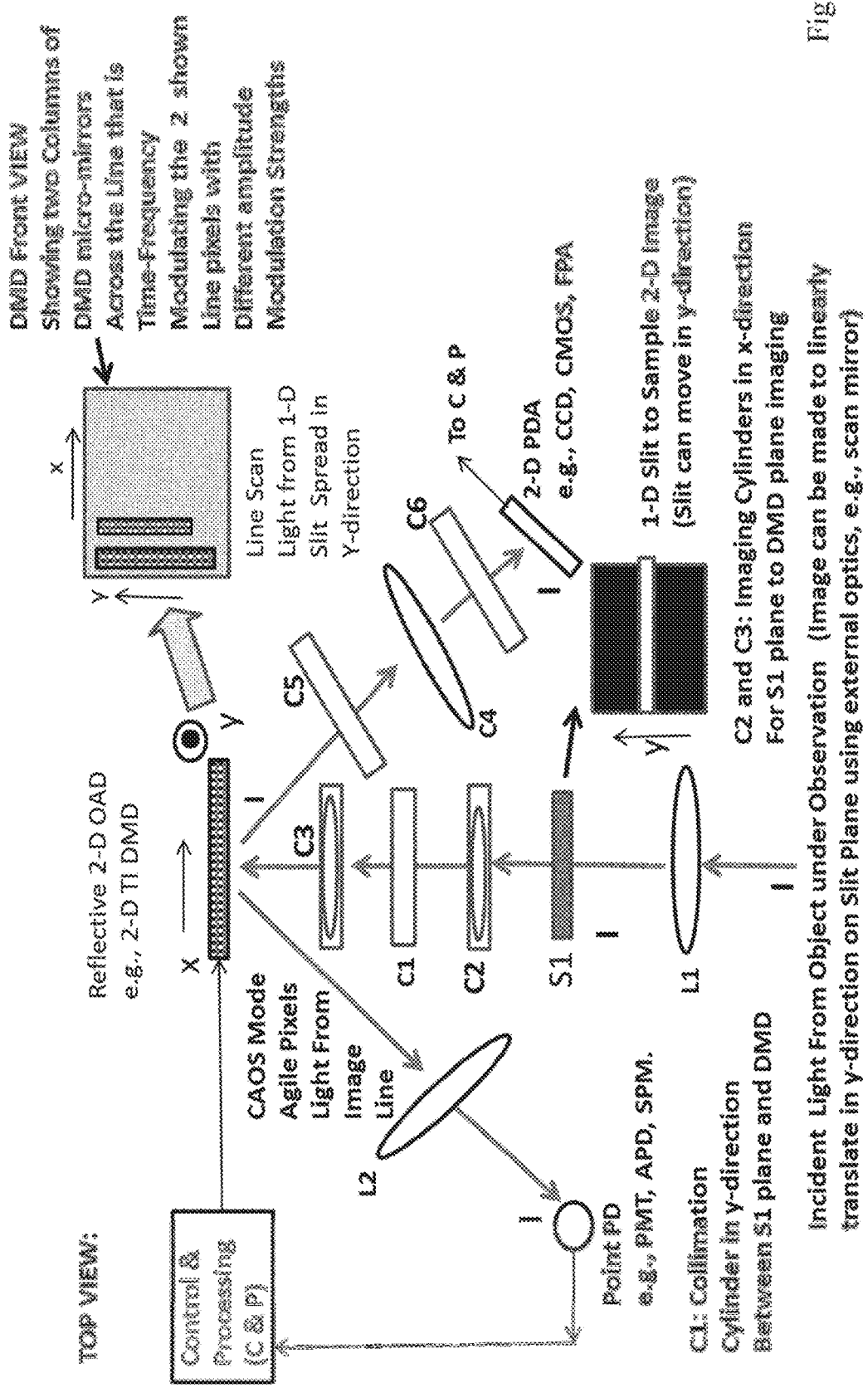
FIG. 21 shows another embodiment of a CAOS Line Scan Camera using a 2-D DMD to implement Analog-Scale Amplitude Modulated CAOS pixels.

The time sequence codes which have so far been described and used for the CAOS pixel coding are binary sequence or digital waveform (e.g., square wave signal) codes with a fixed uniform 1 or 0 amplitude. It will be appreciated however that in an alternative embodiment of the invention, time sequence coding can use continuous wave (CW) or analog waveforms that have a gray-scale amplitude variation in time. Such analog variety time codes can add further programming flexibility and capabilities to the CAOS camera of the present invention. In fact, in one embodiment of the invention a hybrid digital-analog code is used for pixel encoding and decoding. The DMD is inherently a digital on/off amplitude modulation device for an incident light map. As such, the DMD's natural mode of light modulation is not analog. It will be appreciated that it would be highly beneficial to design an analog time coding sequence CAOS camera with the DMD, given the DMD's large 2 million micromirror numbers, broad spectral bandwidth, robust digital MEMS operational mechanism, fast micromirror switching speed (for example 15 microseconds), and small micromirror size (for example 7 microns). FIG. 21 illustrates one embodiment of a 2-D DMD-based CAOS line scan camera that can operate with analog amplitude modulation time coded irradiance signals, where one dimension of the DMD forms the image line and the orthogonal direction of the DMD is modulated to form a gray scale level for the time coded irradiance signal set detected by the point PD. The reference S1 in the figure is a 1-D slit that allows a chosen line of the incident image to pass through into the imaging system to fall as an optical expanded line on the 2-D DMD. The slit position in S1 can move up/down along the y-direction. In one embodiment, the 1-D slit is a programmable line aperture device. In an alternative embodiment, the slit position is kept fixed, but the incident image "I" can be linearly translated up and down as required on the 1-D slit device using light translation optics, such as moving mirrors or prisms. This line (along the x-direction) of light passing through S1 also optical expands in the y-direction using a cylindrical lens C1, with the expanded 2-D light falling on the DMD. Cylindrical lenses C2 and C3 image the slit along the x-direction onto the DMD x-direction. Micromirrors along the y-direction on the DMD for a given pixel on the imaged line in the 2-D incident image are coded by optical gray-scale amplitude modulation, by controlling the binary tilt states of the micromirrors. For example, for 1000 micromirrors along the y-direction, binary ±θ tilt state control of these mirrors can produce analog gray scale modulations from light levels weighted linearly from 1 to 1000, giving a 10-bit gray-scale CDMA code amplitude coding to a given pixel on the x-direction image line. If the image line has 1000 pixels, then the DMD should have 1000 micromirrors along the x-direction of the DMD. FIG. 21 shows two pixels on the image line coded by micromirror state controlled amplitude modulation for a given bit time in an N-bit CDMA code sequence assigned to two pixels in the selected image line. For example, the left pixel has 800 micromirrors in a +θ state to direct light to the point PD, while the right pixel on the line has 600 micromirrors in a +θ state to direct light to the point PD. In this case, it is assumed that there are 1000 micromirrors in the y-direction of the DMD. In FIG. 21, the references C5, C6 and C7 are cylindrical lenses used for imaging, while L2 and L1 are spherical imaging lenses.

Figure 22:
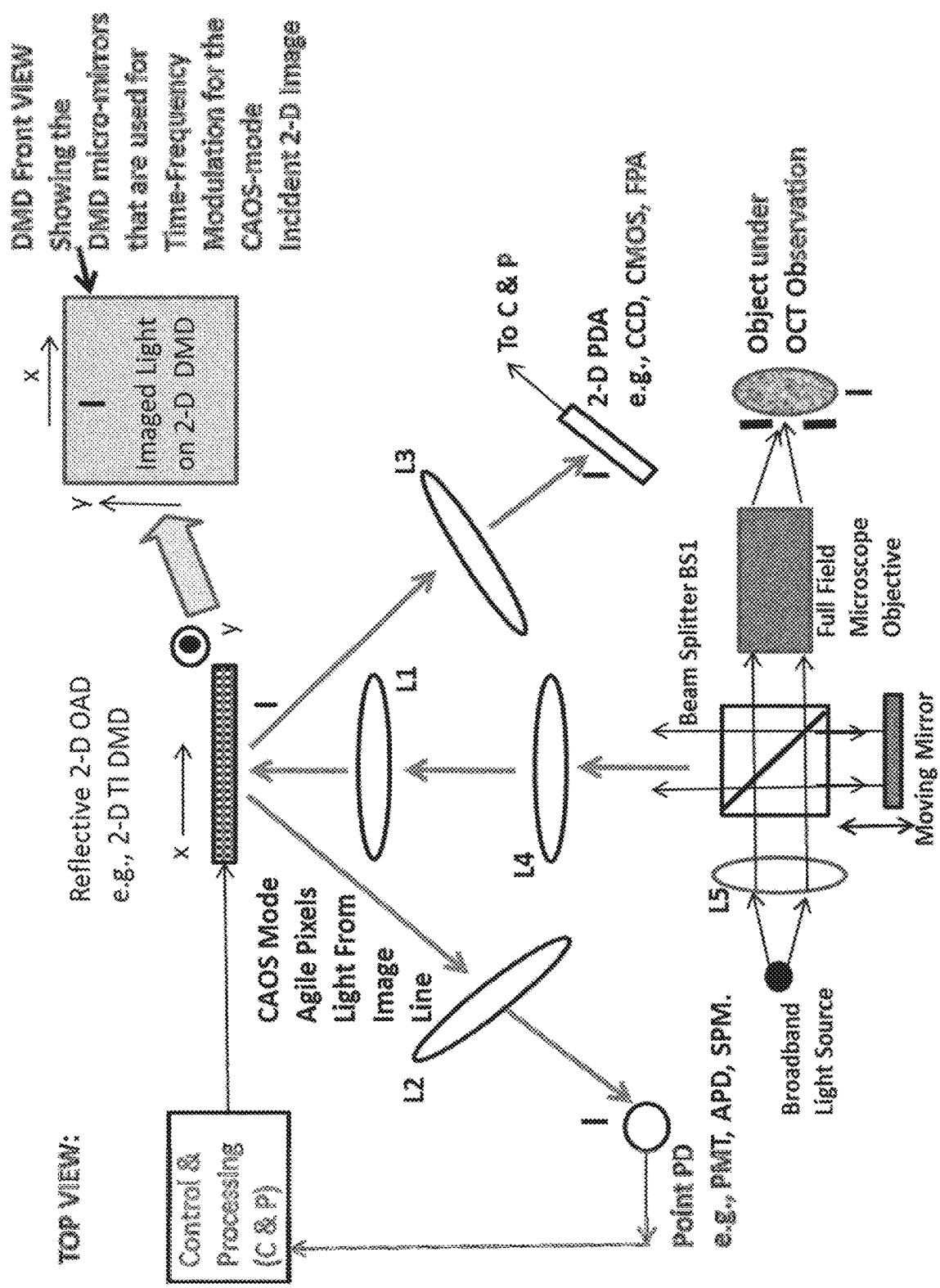
FIG. 22 shows an example of a Full Field Optical Coherence Tomography (OCT) system using the CAOS smart camera of the present invention.

FIG. 22 shows how the CAOS smart camera of the present invention can be for example used as the high dynamic range (HDR) imager in an Optical Coherence Tomography (OCT) system, such as a full field of view (FOV) microscope for the eye. A broadband light source is fed to a Michelson interferometer with a moving mirror arm and an eye imaging arm that forms a classic OCT system. Light from this interferometer enters the CAOS smart camera system for extreme dynamic range, low pixel crosstalk, high SNR, spectrally flexible imaging. It will be appreciated that this leads to new advanced imaging capabilities for any OCT system (e.g., spectral or time domain OCT).

Figure 23:
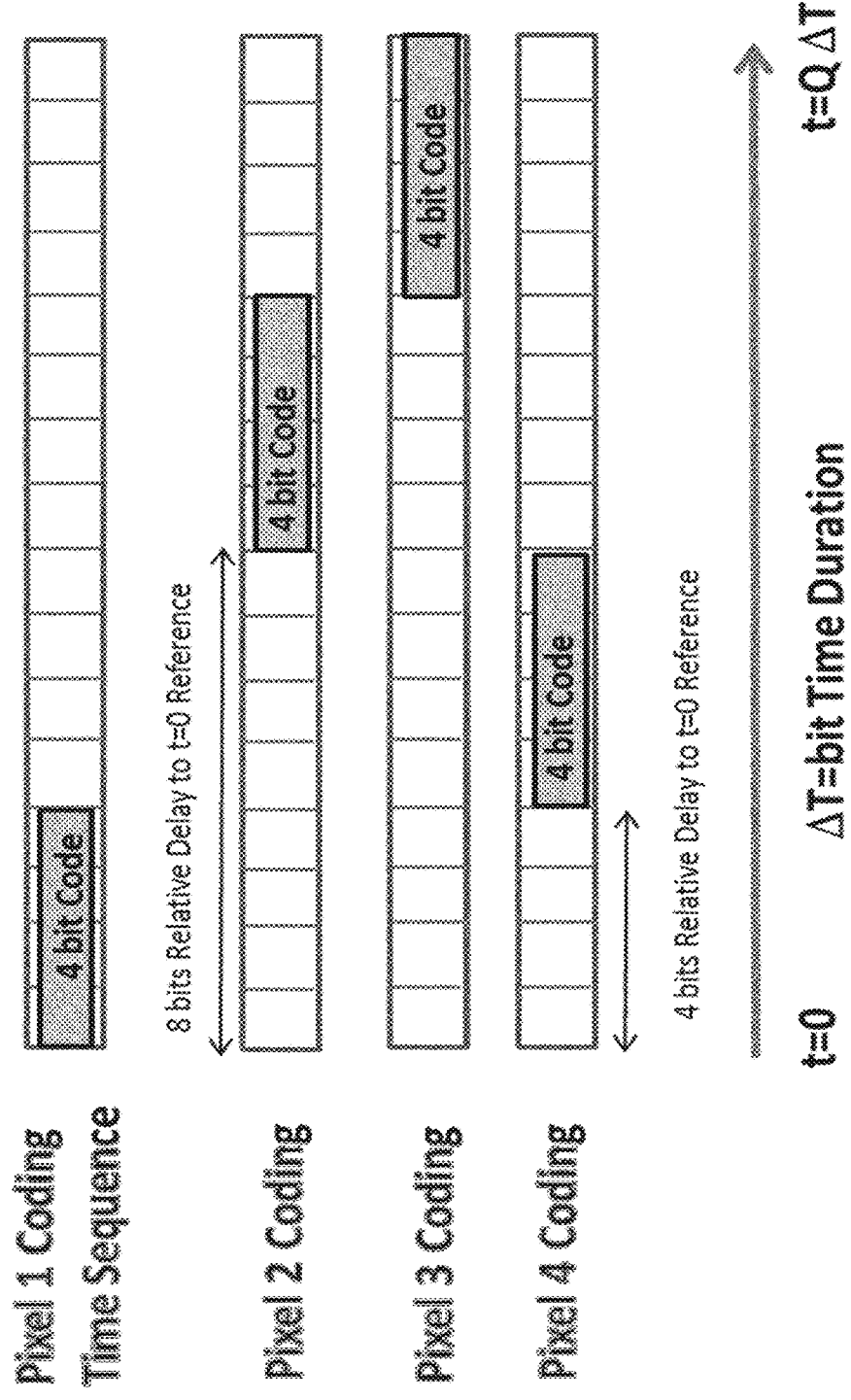
FIG. 23 illustrates the flexible frame time and time delay programming of a CDMA-mode CAOS image frame in accordance with one embodiment of the present invention.

The embodiment of the time-based correlation processing previously described for the decoding of the CAOS pixels of the camera used correlation operations with zero relative delay between the coding time sequences to recover the image pixel irradiances. This was the case because all time sequences coding the CAOS image pixels started and ended at the same time, indicating a zero relative time difference between the pixel coding N-bit time sequences. In an alternative embodiment of the invention, an additional level of programmability within the CAOS camera can be provided by the coding sequences having specific relative time delays between them. FIG. 23 illustrates such a flexible programming of a CDMA-mode CAOS image frame time, and the relative time delays between the P pixel coding N-bit sequences, where P is the number of pixels simultaneously viewed in a CAOS frame. In CAOS, full image frame encoding can be designed using Q masks making Q time slots (each time slot=1 bit time) masks time sequence, with Q>P and N≥P. A specific relative time delay (in bit times) can be placed between the N-bits coding each image pixel. This means that for efficient and robust CAOS decoding of the incident image in the CAOS CDMA-mode of this embodiment, the P relative time delays must be known (in seconds for continuous time delays or number of bit times for discrete step time delays), as well as the integer values for N, Q, and P. For example, if P=8 pixels, N=16 bits, Q=32 bits (time slots), there are P=8 different relative time delays between the P=8 time code sequences used to time-code the P=8 pixels in the P=8 pixels image. Some relative time delays can also be zero delay. It is also possible to change the coding time sequence relative delays and the Q, P, and N numbers for the next imaging CAOS frame. It will be understood that such programmability and security of image is not possible in Hadamard imaging, as each mask is spatially orthogonal to the other masks in the mask time sequence, and the pixel count P is equal to the number of coding masks restricting the number of time slots in the frame to P slots. FIG. 23 shows an example scenario of this embodiment with Q=16 bit time slots, coding with N=4 bits, and a CAOS pixel count P=4. The bit time is ΔT. It can be seen from this figure that the relative time delays with the t=0 reference time is: Pixel 1: 0 bit time slots, Pixel 2: 8 bits, Pixel 3: 12 bits and Pixel 4: 4 bits. In other words, relative delays when using 4-bit Hadamard time sequences codes have to be in 4-bit steps, in order to preserve pixel time code orthogonality with other pixel codes in the 16-bit time CAOS frame slot. In the example shown in FIG. 23, codes can be placed in 4 different time slots in the CAOS frame of 16 bits duration. Hence, it is necessary to design the relative pixel code sequence delays to meet certain code criteria, such as an ideal orthonormal sequences in time. In the example of FIG. 23, the use of four 4-bit codes relates to considering signal orthogonality within a 16×16 Hadamard matrix, as 4 bits×4 codes (or pixels)=16.

It should further be noted that the CAOS Smart Camera works in collaboration and not in competition with the PDA Sensor/Technology. The CAOS smart camera engages intelligent computational imaging techniques and processing within its hardware for guided extractions of scene high value targets, as well as uses image fusion for optimal image construction.

It will be appreciated that the commercial applications of the CAOS camera of the present invention across a multi-billion euro industry are diverse. For example, the camera could be used in many industries such as media, 3D entertainment, robotics, defence, science exploration, underwater environments, space platforms, medicine, three dimensional shape measurement and manufacturing.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method for performing high dynamic range low inter-pixel spatial and wavelength crosstalk optical image detection in a camera comprising:
   imaging incident light from an object onto an image plane of an Optical Array Device (OAD) to form an incident image map;
   selecting by the OAD and a point Photo Detector (PD) and by the OAD and a Photo Detector Array (PDA) a plurality of pixels on the incident image map for time-frequency coding;
   associating a unique binary code sequence with each of the selected plurality of pixels;
   time-frequency coding the selected plurality of pixels by the OAD;
   detecting by the point PD optical irradiance values of the time-frequency coded pixels output from the OAD; and
   performing signal processing on the detected optical irradiance values to determine light intensity of each of the selected plurality of pixels to acquire an image of the object,
   wherein the step of time-frequency coding the selected plurality of pixels by the OAD comprises time modulating incident light irradiance of each of the selected plurality of pixels with their associated binary code sequence.

2. The method of claim 1, wherein the step of selecting the plurality of pixels on the incident image map for time-frequency coding comprises:
   detecting by the PDA intensity values of the incident image map output from the OAD; and
   performing multi-image processing on the detected intensity values to select the plurality of pixels on the incident image map for time-frequency coding.

3. The method of claim 1, wherein the step of selecting the plurality of pixels on the incident image map for time-frequency coding comprises:
   performing by the OAD spatial code modulation of the incident image map;
   detecting by the point PD intensity values of the spatial code modulated light output from the OAD; and
   performing computational image processing on the detected intensity values to select the plurality of pixels on the incident image map for time frequency coding.

4. The method of claim 3, wherein the step of performing by the OAD spatial code modulation of the incident image map comprises displaying a plurality of 2-D spatial masks on the OAD.

5. The method of claim 4, wherein the step of displaying the plurality of 2-D spatial masks on the OAD further comprises oscillating in time each of the displayed 2-D spatial masks on the OAD.

6. The method of claim 5, wherein the step of oscillating in time each of the displayed 2-D spatial masks on the OAD comprises switching the OAD from displaying a 2-D spatial mask to a dummy spatial mask after an OAD frame time for a predetermined time period.

7. The method of claim 6, wherein the step of detecting by the point PD intensity values of the spatial code modulated light comprises generating by the point PD an AC signal proportional to the intensity values with a base repetition frequency equal to half a frame rate of the OAD.

8. The method of claim 3, wherein the computational image processing comprises linear transform imaging or non-linear imaging.

9. The method of claim 8, wherein linear transform imaging comprises imaging using a Hadamard transform.

10. The method of claim 8, wherein non-linear imaging comprises compressive sensing computational imaging using an iterative algorithm.

11. The method of claim 3, wherein the incident light comprises light emitted from a specimen in a digital holography system and passed through a microscope objective, the method further comprising:
   focusing the incident light prior to imaging the light onto the image plane of the OAD; and
   focusing light output from the OAD prior to detection by the point PD and by the PDA.

12. The method of claim 1, wherein the OAD comprises a Digital MicroMirror Device.

13. The method of claim 1, further comprising:
   repeating the steps of the method in respect of one or more different modes of operation of the camera to acquire a set of images of the object; and
   performing image fusion techniques on the acquired set of images to form an optimal image of the object.

14. The method of claim 3, wherein the OAD comprises a transmissive OAD and the incident light comprises multi-band light, and wherein the camera comprises a first point PD and a second point PD, a first PDA and a second PDA, and further comprises a first tunable filter, a second tunable filter, a third tunable filter and a fourth tunable filter, a first dichroic beam splitter filter and a second dichroic beam splitter filter and a broadband beam splitter, and wherein the method further comprises:
   configuring the broadband beam splitter to direct a first portion of the multi-band light to the first dichroic beam splitter and to direct a second portion of the multi-band light to the second dichroic beam splitter;
   directing by the first dichroic beam splitter filter light output from the OAD having a wavelength within a first predetermined optical band to the first point PD for detection via the fourth tunable filter and light having a wavelength within a second predetermined optical band to the second point PD for detection via the third tunable filter; and
   directing by the second dichroic beam splitter filter light having a wavelength within the second predetermined optical band to the first PDA for detection via the second tunable filter and light having a wavelength within the first predetermined optical band to the second PDA for detection via the first tunable filter.

15. The method of claim 1, wherein time modulating the incident light irradiance of each of the selected plurality of pixels with their associated binary code sequence comprises baseband Code Division Multiple Access (CDMA) modulation.

16. The method of claim 1, wherein time modulating the incident light irradiance of each of the selected plurality of pixels with their associated binary code sequence comprises Code Division Multiple Access (CDMA) modulation at a carrier frequency.

17. The method of claim 3, wherein the OAD comprises a reflective 2-D OAD, and wherein the incident light comprises light emitted from an optical coherence tomography (OCT) system.

18. A Coded Access Optical Sensor (CAOS) camera for performing high dynamic range low inter-pixel spatial and wavelength crosstalk optical image detection, the camera comprising:
   an Optical Array Device (OAD);
   a point Photo Detector (PD);
   a Photo Detector Array (PDA);
   a first lens for directing incident light from an object to the OAD;
   a module for imaging focused incident light onto an image plane of the OAD to form an incident image map;
   a module for selecting by the OAD and the Point Photo Detector and by the OAD and the Photo Detector Array a plurality of pixels on the incident image map for time-frequency coding;
   a module for associating a unique binary code sequence with each of the selected plurality of pixels;
   a module for time-frequency coding the selected plurality of pixels by the OAD by time modulating incident light irradiance of each of the selected plurality of pixels with their associated binary code sequence;
   a module for detecting by the point PD optical irradiance values of the time-frequency coded pixels output from the OAD; and
   a module for performing signal processing on the detected optical irradiance values to determine the light intensity of each of the selected plurality of pixels to acquire an image of the object.

19. The CAOS camera of claim 18, wherein the first lens, the OAD and the point PD are arranged such that the OAD is located substantially above and adjacent the point PD in a vertical plane and, wherein the first lens is located substantially above the OAD in the vertical plane.

* * * * *

UNITED STATES PATENT AND TRADEMARK OFFICE
CERTIFICATE OF CORRECTION

PATENT NO. : 11,175,489 B2
APPLICATION NO. : 16/479915
DATED : November 16, 2021
INVENTOR(S) : Nabeel Riza It is certified that error appears in the above-identified patent and that said Letters Patent is hereby corrected as shown below:

On the Title Page

Item [56], OTHER PUBLICATIONS should read:

Riza Nabeel A "Coded access optical sensor (CAOS) imager and applications." Optics, Photonics and Digital Technologies for Imaging Applications IV. SPIE Proc. Vol. 9896. International Society for Optics and Photonics, 2016.

Riza Nabeel A "The CAOS camera platform: ushering in a paradigm change in extreme dynamic range imager design." Emerging Digital Micromirror Device Based Systems and Applications IX. SPIE Proc. Vol. 10117. International Society for Optics and Photonics, 2017.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*